US008971428B2

(12) United States Patent
Lakhzouri et al.

(10) Patent No.: US 8,971,428 B2
(45) Date of Patent: Mar. 3, 2015

(54) CYCLIC SHIFT DELAY DETECTION USING A CHANNEL IMPULSE RESPONSE

(71) Applicants: Abdelmonaem Lakhzouri, Tampere (FI); Florean Curticapean, Tampere (FI)

(72) Inventors: Abdelmonaem Lakhzouri, Tampere (FI); Florean Curticapean, Tampere (FI)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 13/624,646

(22) Filed: Sep. 21, 2012

(65) Prior Publication Data

US 2014/0086284 A1    Mar. 27, 2014

(51) Int. Cl.
H04B 7/02      (2006.01)
H04B 7/06      (2006.01)
G01S 5/02      (2010.01)
H04W 64/00     (2009.01)

(52) U.S. Cl.
CPC ............. H04B 7/0671 (2013.01); *H04W 64/00* (2013.01); G01S 5/0273 (2013.01)
USPC .......................................... 375/260; 375/267

(58) Field of Classification Search
CPC .... H04B 7/067; H04B 7/0671; H04L 5/0023; H04L 5/0007; H04L 25/0202; H04L 25/0212
USPC ........................... 375/219–220, 260, 267, 299
See application file for complete search history.

(56) References Cited

U.S. PATENT DOCUMENTS

| 7,813,330 | B2 |  | 10/2010 | Yu et al. |
| 8,144,683 | B1 |  | 3/2012 | Sun et al. |
| 8,149,942 | B1 |  | 4/2012 | Wang et al. |
| 8,620,230 | B2 | * | 12/2013 | Sanderovitz et al. ......... 455/101 |
| 2005/0107969 | A1 |  | 5/2005 | Jitsukawa et al. |
| 2005/0163265 | A1 | * | 7/2005 | Gupta ........................... 375/343 |
| 2005/0265477 | A1 | * | 12/2005 | Takeda et al. ................. 375/299 |
| 2006/0221810 | A1 | * | 10/2006 | Vrcelj et al. .................. 370/208 |
| 2007/0165726 | A1 | * | 7/2007 | Ding et al. .................... 375/260 |
| 2007/0206686 | A1 | * | 9/2007 | Vook et al. .................... 375/260 |
| 2007/0230403 | A1 |  | 10/2007 | Douglas et al. |
| 2007/0270273 | A1 | * | 11/2007 | Fukuta et al. ................. 475/206 |
| 2008/0132282 | A1 | * | 6/2008 | Liu et al. .................... 455/562.1 |

(Continued)

FOREIGN PATENT DOCUMENTS

EP    2151937 A1    2/2010
EP    2169863 A1    3/2010

(Continued)

OTHER PUBLICATIONS

CISCO, "802.11ac: The Fifth Generation of Wi-Fi," Technical White Paper, Aug. 2012, pp. 1-25.

(Continued)

*Primary Examiner* — Emmanuel Bayard
(74) *Attorney, Agent, or Firm* — Silicon Valley Patent Group LLP

(57) ABSTRACT

Systems, apparatus and methods for determining a cyclic shift diversity (CSD) mode are presented. Examples use a channel impulse response (CIR) to determine a current CSD mode. Specifically, a channel impulse response from an orthogonal frequency-division multiplexing (OFDM) symbol, which forms CIR samples. The CIR samples are examined to find a local maxima. A current CSD mode may be selected based on the local maxima found in the CIR samples.

20 Claims, 24 Drawing Sheets

(56) References Cited

U.S. PATENT DOCUMENTS

| | | | |
|---|---|---|---|
| 2010/0067599 A1 | 3/2010 | Dayal et al. | |
| 2010/0075693 A1* | 3/2010 | Kishigami et al. | 455/452.2 |
| 2010/0091915 A1 | 4/2010 | Xu et al. | |
| 2010/0103810 A1* | 4/2010 | Kloos et al. | 370/204 |
| 2010/0197264 A1 | 8/2010 | Azadet et al. | |
| 2010/0273438 A1 | 10/2010 | Nishio et al. | |
| 2010/0290553 A1 | 11/2010 | Li et al. | |
| 2011/0142075 A1 | 6/2011 | Che et al. | |
| 2011/0159831 A1* | 6/2011 | Jiang | 455/226.3 |
| 2011/0280188 A1 | 11/2011 | Jeon et al. | |
| 2011/0280349 A1 | 11/2011 | Hong et al. | |
| 2011/0305178 A1 | 12/2011 | Zheng et al. | |
| 2012/0057491 A1 | 3/2012 | Tiirola et al. | |
| 2012/0087401 A1 | 4/2012 | Bhattad et al. | |
| 2012/0087427 A1 | 4/2012 | Noh et al. | |
| 2012/0177019 A1 | 7/2012 | Zhang | |
| 2013/0121392 A1* | 5/2013 | Thompson et al. | 375/227 |
| 2013/0128935 A1* | 5/2013 | Janani et al. | 375/222 |
| 2013/0336144 A1* | 12/2013 | Azadet et al. | 370/252 |
| 2014/0086369 A1 | 3/2014 | Zhang et al. | |
| 2014/0087751 A1 | 3/2014 | Do et al. | |
| 2014/0153420 A1 | 6/2014 | Garin et al. | |

FOREIGN PATENT DOCUMENTS

| | | |
|---|---|---|
| WO | 2005055543 A1 | 6/2005 |
| WO | 2005081481 A1 | 9/2005 |
| WO | WO2008000069 A1 | 1/2008 |
| WO | 2010052673 A1 | 5/2010 |
| WO | 2010124448 A1 | 11/2010 |
| WO | 2011040789 A2 | 4/2011 |

OTHER PUBLICATIONS

Guerrero L., et al., "Performance Analysis of Distributed CDD MC-CDMA Sensor Networks with Frequency-Correlated Subcarriers over Nakagami-m Fading Channels", Vehicular Technology Conference, 2008. VTC Spring 2008, IEEE, IEEE, Piscataway, NJ, USA, May 11, 2008, pp. 81-85, XP031255493, ISBN: 978-1-4244-1644-8.

IEEE P802.11ac/D4.0, Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz., Oct. 2012, 408 pages.

International Search Report and Written Opinion—PCT/US2012/056930—ISA/EPO—Jul. 22, 2013.

Paul T.K., et al., "Evolution, insights and challenges of the PHY layer for the emerging ieee 802.11n amendment", IEEE Communications Surveys, IEEE, New York, NY, US, vol. 11, No. 4, Oct. 1, 2009, pp. 131-150, XP011285647, ISSN: 1553-877X, 001: 10.1109/SURV.2009.090408.

Plass S., et al., "An Overview of Cyclic Delay Diversity and its Applications", Vehicular Technology Conference, 2008. VTC 2008—Fall. IEEE 68th, IEEE, Piscataway, NJ, USA, Sep. 21, 2008, pp. 1-5, XP031352316, ISBN: 978-1-4244-1721-6.

Xu Y., et al., "Sampling Clock Offset Estimation Algorithm Based on IEEE 802. 11n", Networking, Sensing and Control, 2008, ICNSC 2008, IEEE International Conference on, IEEE, Piscataway, NJ, USA, Apr. 6, 2008, pp. 523-527, XP031255223.

Yao X., et al., "An improved channel detection method for IEEE 802.11N MIMO system", Journal of Electronics (China), SP Science Press, Heidelberg, vol. 28, No. 4-6, Mar. 8, 2012, pp. 658-663, XP035024713, ISSN: 1993-0615, DOI: 10.1007/S11767-012-0788-9.

Liang, Y.C., et al., "Design of cyclic delay diversity for single carrier cyclic prefix (SCCP) transmissions with block-iterative GDFE (BI-GDFE) receiver", IEEE Transactions on Wireless Communications, IEEE Service Center, Piscataway, NJ, US, vol. 7, No. 2, Feb. 1, 2008, pp. 677-684, XP011225080, ISSN: 1536-1276, D0I:10.1109/TWC.2008.060625 sections III and IV.

Yuen, C., et al., "Comparative Study of Open-Loop Transmit Diversity Schemes for Four Transmit Antennas in Coded OFDM Systems", Vehicular Technology Conference, 2007. VTC-2007 Fall. 2007 IEEE 66TH, IEEE, PI, Sep. 1, 2007, pp. 482-485, XP031147450, ISBN: 978-1-4244-0263-2, the whole document.

GSMA, "RCS-e—Advanced Communications: Services and Client Specification," Version 1.2.2, Jul. 2012, 169 pages.

Erceg V., et al., "IEEE P802.11 Wireless LANs, TGn Channel Models", IEEE 802.11-03/940r4, May 10, 2004, pp. 1-45.

Himayat N., et al., "System Performance of Transmit Diversity Schemes for Interference-Limited Cellular Systems," IEEE Global Telecommunications Conference (GLOBECOM), Nov. 2007, pp. 4215-4220.

"IEEE Standard for Information technology—Telecommunications and information exchange between systems—Local and metropolitan area networks—Specific requirements—Part 11: Wireless LAN Medium Access Control (MAC)and Physical Layer (PHY) Specifications Amendment 5: Enhancements for Higher Throughput" IEEE Std 802.11n-2009 (Amendment to IEEE Std 802.11-2007), IEEE Standard, IEEE, Piscataway, NJ, USA, Oct. 29, 2009, pp. 1-565, XP017694836, ISBN: 978-0/7381-6046-7.

Zhou L., et al., "Channel Estimation of Multiple Transmit Antennas for OFDM Systems with Cyclic Delay Preamble," IEEE 62nd Vehicular Technology Conference (VTC), 2005, pp. 583-587.

* cited by examiner

| CSD Mode | Number of transmitters | Cyclic shift delay (CSD) for each transmitter (ns) | | | |
|---|---|---|---|---|---|
| | | 1 | 2 | 3 | 4 |
| 1 | 1 | 0 | N/A | N/A | N/A |
| 2 | 2 | 0 | -200 | N/A | N/A |
| 3 | 3 | 0 | -100 | -200 | N/A |
| 4 | 4 | 0 | -50 | -100 | -150 |
| ... | ... | ... | ... | ... | ... |

↑ CSD spacing between transmitters

FIG. 6

OFDM symbol

Assistance data

| ... | Current CSD Mode |
|---|---|

FIG. 27

Assistance data

| ... | Number of transmitters |
|---|---|

FIG. 28

Assistance data

| ... | CSD spacing between transmitters |
|---|---|

FIG. 29

Assistance data

| ... | Criteria for enabling/ disabling CSD mode |
|---|---|

FIG. 30

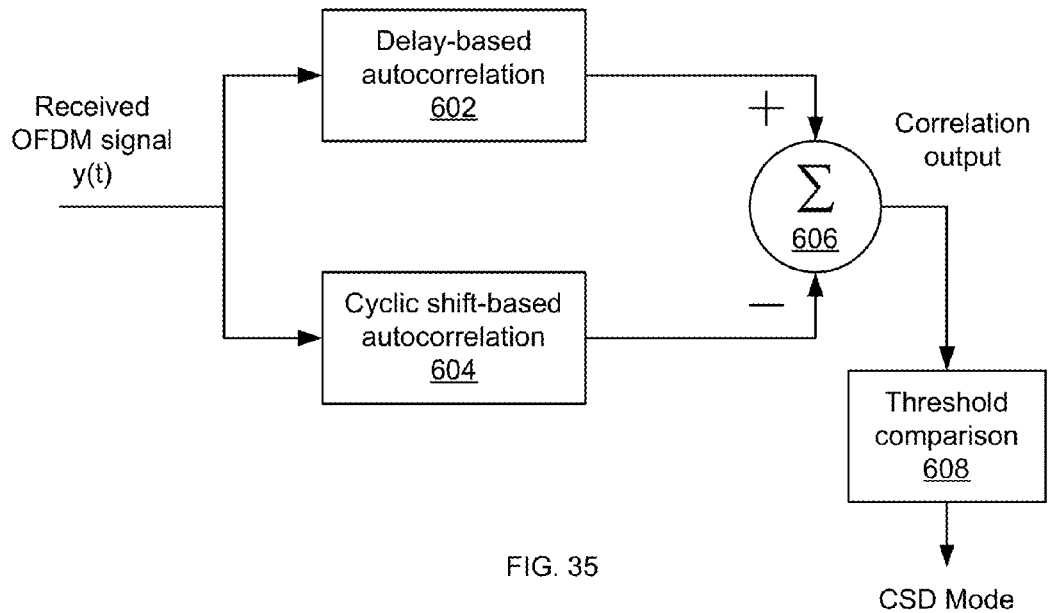

FIG. 35

Delay-based autocorrelation of received OFDM signal y(t)

$$R^k_{delay}(\tau) = \sum_{i=N_g+N_S-N_C+1}^{N_g+N_S} y(i) y^*(i+\tau)$$

$$R^k_{delay}(\tau) = \sum_{i=N_g+N_S-N_C+1}^{N_g+N_S-\tau} y_k(i) y_k^*(i+\tau) + \sum_{i=N_g+N_S-\tau+1}^{N_g+N_S} y_k(i) y_{k+1}^*(i+\tau-N_g-N_S)$$

FIG. 36

Cycle shift-based autocorrelation of received OFDM signal y(t)

$$R^k_{CS}(\tau) = \sum_{i=N_g+N_S-N_C+1}^{N_g+N_S-\tau} y_k(i) y_k^*(i+\tau) + \sum_{i=N_g+N_S-\tau+1}^{N_g+N_S} y_k(i) y_k^*(i+\tau-N_S)$$

FIG. 37

Delay-based autocorrelation of (two-path) multipath signal y(t)

(e.g., $\Delta_{MP}$ = 200 ns)

Cyclic shift-based autocorrelation of (two-path) multipath signal y(t)

Delay-based autocorrelation of (two-transmitter) cyclic-shift signal y(t)

(e.g., $\Delta_{CS}$ = 200 ns)

Cyclic shift-based autocorrelation of (two-transmitter) cyclic-shift signal y(t)

Delay-based autocorrelation of (three-path) multipath signal y(t)

(e.g., $\Delta_{MP}$ = 100 ns)

Cyclic shift-based autocorrelation of (three-path) multipath signal y(t)

Delay-based autocorrelation of (three-transmitter) cyclic-shift signal y(t)

(e.g., $\Delta_{CS}$ = 100 ns)

Cyclic shift-based autocorrelation of (three-transmitter) cyclic-shift signal y(t)

CYCLIC SHIFT DELAY DETECTION USING A CHANNEL IMPULSE RESPONSE

CROSS-REFERENCE TO RELATED APPLICATIONS

This application is related to U.S. patent application Ser. No. 13/624,653, entitled "Cyclic shift delay detection using signaling" and filed on Sep. 21, 2012, the contents of which are incorporated herein by reference.

This application is related to U.S. patent application Ser. No. 13/624,649, entitled "Cyclic shift delay detection using autocorrelations" and filed on Sep. 21, 2012, the contents of which are incorporated herein by reference.

BACKGROUND

I. Field of the Invention

This disclosure relates generally to apparatus and methods for mobile positioning, and more particularly to determining final transmission in a cyclic-shift diversity (CSD) signaling mode.

II. Background

To estimate a location, a mobile device may capture received signal strength indication (RSSI) measurements from three or more access points. A server or the mobile device itself may apply trilateration to these RSSI measurements to estimate a position of the mobile device, however, these RSSI measurements have a large standard deviation. Unfortunately, trilateration with such RSSI measurements results in a high level of uncertainty because of the uncertainty of the RSSI measurement levels.

To alleviate high uncertainties associated with RSSI measurements, round-trip time (RTT) measurements may be used. RTT measurements advantageously have a much lower level of uncertainty than the RSSI measurements. RTT measurements record a round-trip time from initiating a signal from the mobile device to an access point and back to the mobile device. Though several uncertainties exist with RTT measurement, these variables may be determined or estimated with less uncertainty that is associated with RSSI measurements. A server or a mobile device may use the RTT measurements in trilateration to more accurately estimate the position of the mobile device.

Recently, Cyclic Shift Diversity (CSD) has been introduced into the IEEE 802.11n standard to improve reception by spatial spreading the streams across multiple antennas and transmitting the same signal with different cyclic shifts. With the effects of multiple transmissions and multipath, RTT measurements no longer provide reliable time measurements because of multiple possible start times.

Various CSD modes are defined in the IEEE 802.11n standard. A single-transmitter system does not use cyclic shifting (CSD mode 1). In other words, CSD is disabled when operating in CSD mode 1 and only one transmitter is operating. When two or more transmitters are operating, cyclic shifting may be disabled and identical signals are transmitted from each antenna. Alternatively, cyclic shifting may be enabled and a different time-shifted signal of an original signal is transmitted from each antenna. In CSD mode 2, two transmitters transmit: a first transmitter transmits the original signal and a second transmitter transmits a time-shifted signal advanced by 200 ns using cyclic shifting. In CSD mode 3, three transmitters transmit: a first transmitter transmits the original signal, a second transmitter transmits a time-shifted signal advanced by 100 ns, and a third transmitter transmits a signal advanced by an additional 100 ns. In CSD Mode 4, four transmitters transmit: a first transmitter transmits the original signal, a second transmitter advances the signal by 50 ns, a third transmitter advances the signal by an additional 50 ns, and a fourth transmitter advances the signal by another 50 ns for a total of 150 ns from the original signal. More CSD modes may be defined in the future. These CSD modes are recommendations and not requirements. A specific manufacturer is free to utilized non-standard implementations. As such, a non-standard CSD mode may be defined base on a number of transmitters (e.g., 2, 3 or 4 transmitters) along with a temporal spacing (e.g., 50 ns, 100 ns, 150 ns, 200 ns).

As a result, RTT measurements may be skewed with false positive signals when CSD is enabled. Alternatively, multipath may appear as a multi-transmitter CSD mode signal when in fact CSD is disabled and only a signal transmitter is used. Without some other detection and correction processing, RTT measurements may select a first-to-arrive signal (having a transmitter advanced signal using cyclic shifting from a second or subsequent transmitter) rather than the last transmission (from the first transmitter).

Therefore, what is needed is a way to determine if CSD is enabled. Also, if enabled, what CSD mode is operational, thereby providing accurate RTT measurement that may be used for mobile device positioning.

BRIEF SUMMARY

Disclosed are systems, apparatus and methods for communicating and determining a CSD mode.

According to some aspects, disclosed is a method for finding cyclic shift diversity (CSD) using channel impulse response (CIR), the method comprising: receiving an orthogonal frequency-division multiplexing (OFDM) symbol; computing a channel impulse response of the ODFM symbol to form CIR samples; finding local maxima in the CIR samples; and selecting a CSD mode based on the local maxima.

According to some aspects, disclosed is a mobile device for finding cyclic shift diversity (CSD) using channel impulse response (CIR), the device comprising: a transceiver, the transceiver for receiving an orthogonal frequency-division multiplexing (OFDM) symbol; and a processor coupled to the transceiver, the processor for: computing a channel impulse response of the ODFM symbol to form CIR samples; finding local maxima in the CIR samples; and selecting a CSD mode based on the local maxima.

According to some aspects, disclosed is a mobile device for finding cyclic shift diversity (CSD) using channel impulse response (CIR), the device comprising: means for receiving an orthogonal frequency-division multiplexing (OFDM) symbol; means for computing a channel impulse response of the ODFM symbol to form CIR samples; means for finding local maxima in the CIR samples; and means for selecting a CSD mode based on the local maxima.

According to some aspects, disclosed is a non-volatile computer-readable storage medium including program code stored thereon, comprising program code for: receiving an orthogonal frequency-division multiplexing (OFDM) symbol; computing a channel impulse response of the ODFM symbol to form CIR samples; finding local maxima in the CIR samples; and selecting a CSD mode based on the local maxima.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

FIGS. 6 to 11 show various standard and non-standard implementations of CSD modes.

FIGS. 27 to 34 define a first method to determine a CSD mode by signaling CSD information between an access point and a mobile device, in accordance with some embodiments of the present invention.

FIGS. 35 to 54 show how to determine a CSD mode by using a combination of delay-based autocorrelation and cyclic shift-based autocorrelation, in accordance with some embodiments of the present invention.

DETAILED DESCRIPTION

Figure 1:
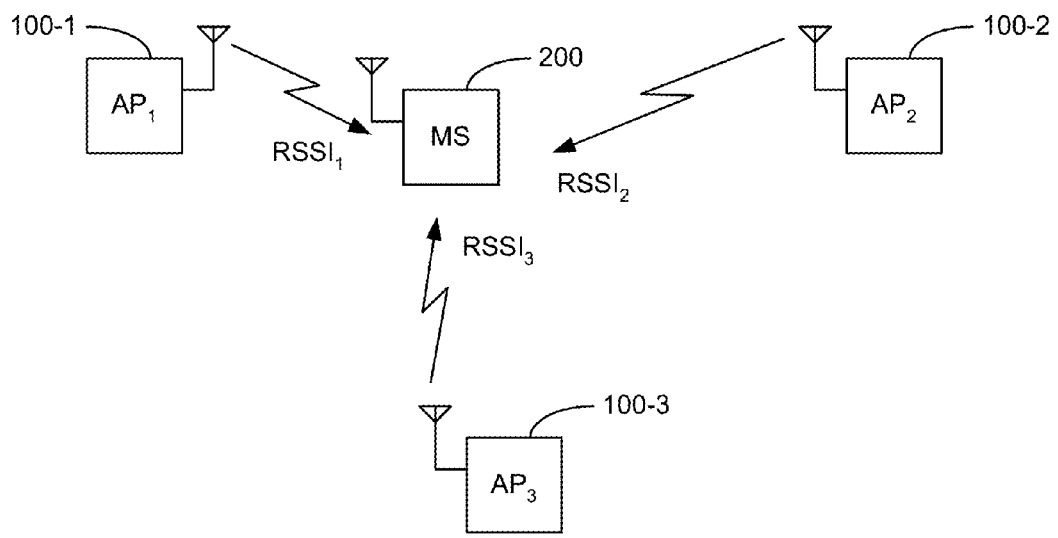
FIG. 1 illustrates trilateration using RSSI measurements.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system (s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile device, sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device."

FIG. 1 illustrates trilateration using RSSI measurements. A mobile device (e.g., mobile station, user equipment or MS 200) receives signals from multiple access points 100 (e.g., $AP_1$ 100-1, $AP_2$ 100-2 & $AP_3$ 100-3). MS 200 records RSSI measurements (e.g., $RSSI_1$, $RSSI_2$ & $RSSI_3$) from each access point. Knowing the location of each access point, MS 200 weights their locations by the RSSI measurements to form a position estimate.

Figure 2:
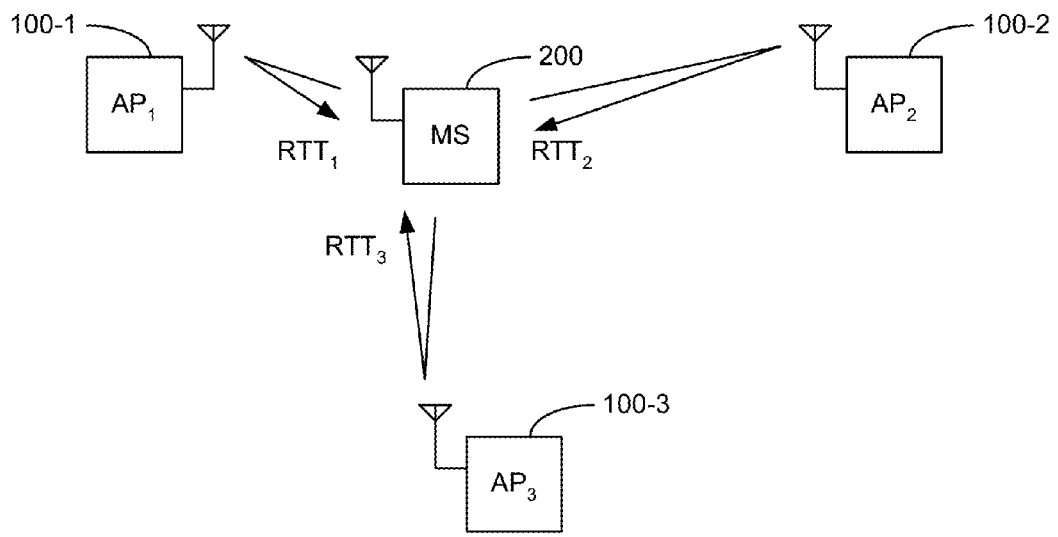
FIG. 2 illustrates trilateration using RTT measurements.

FIG. 2 illustrates trilateration using RTT measurements. MS 200 sends signals to multiple access points 100 (e.g., $AP_1$ 100-1, $AP_2$ 100-2 & $AP_3$ 100-3). Each access point 100 immediately sends back an acknowledgement to form a round-trip signal. The travel time of the round-trip signal may be determined for each access point as $RTT_1$, $RTT_2$ and $RTT_3$, respectfully. With knowledge of the location of each access point 100 and the respective RTT, MS 200 may calculate its position estimate.

Figure 3:
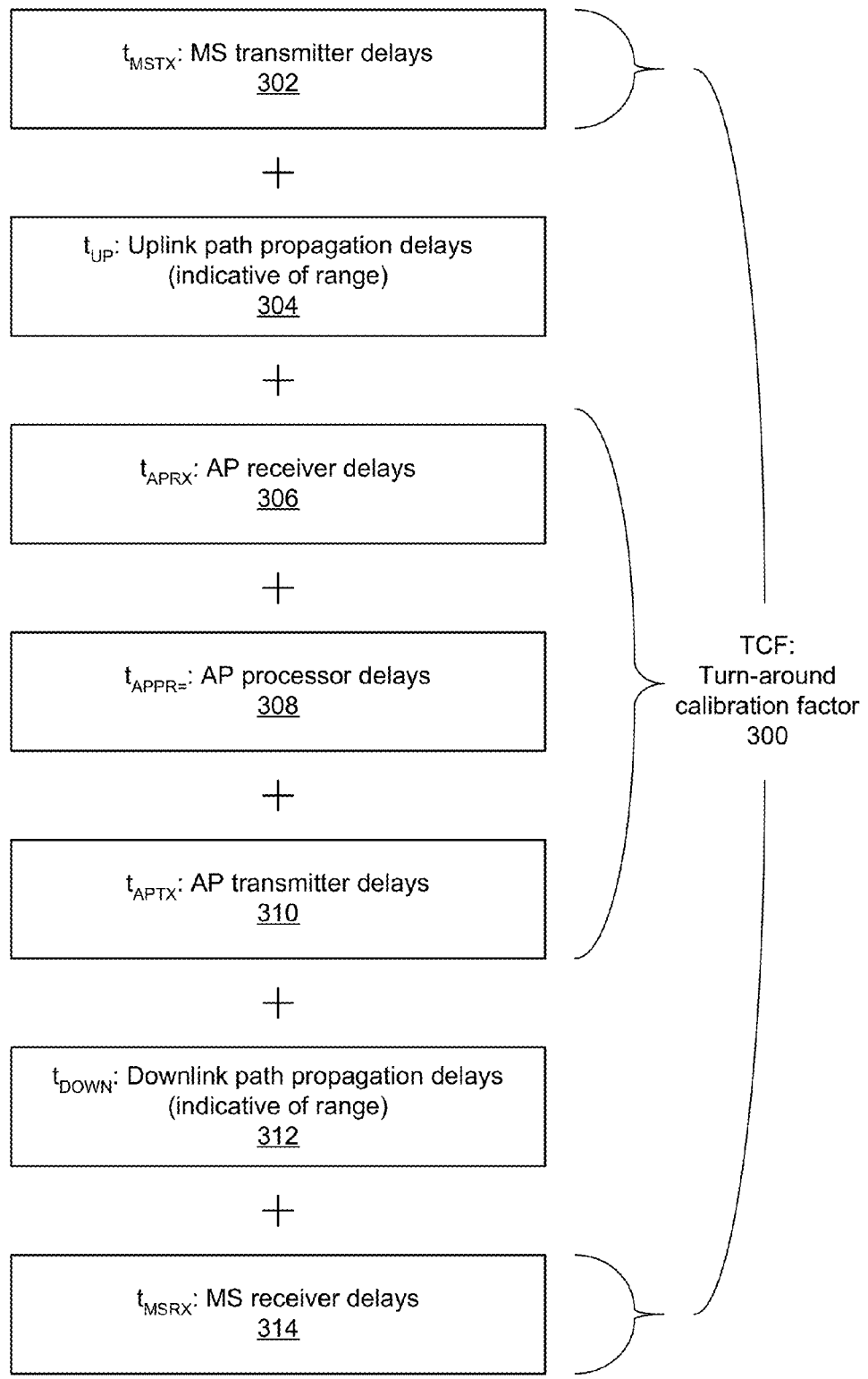
FIG. 3 shows delays associated with RTT measurements.

FIG. 3 shows delays associated with RTT measurements. The total delay is referred to as a turn-around calibration factor or TCF 300. The TCF 300 may be approximated, assumed, measured or estimated. At 302, a first delay is the MS transmitter delay ($t_{MSTX}$). At 304, a second delay is the uplink path propagation delay ($t_{UP}$), which is indicative of range. At 306, a third delay represents receiver delays in the access point ($t_{APRX}$). At 308, a fourth delay is the processor delay in the access point ($t_{APPR}$). At 310, a fifth delay is the transmitter delay in the access point ($t_{APTX}$). At 312, a sixth delay is the downlink path propagation delays ($t_{DOWN}$), which is also indicative of range. At 314, a seventh delay is the receiver delay in MS 200 ($t_{MSRX}$).

Both delays indicative of range (namely, $t_{UP}$ and $t_{DOWN}$) may be excluded from TCF 300. Therefore, the measured delay may be adjusted by TCF 300 to result in the signal travel time. That is, RTT measured–TCF=RTT. Finally, RTT may be converted to a range by computing the one-way time and adjusting for the speed of light (range=c*{RTT/2}, where c represents the speed of light and {RTT/2} represents the one-way time of signal travel).

Figure 4:
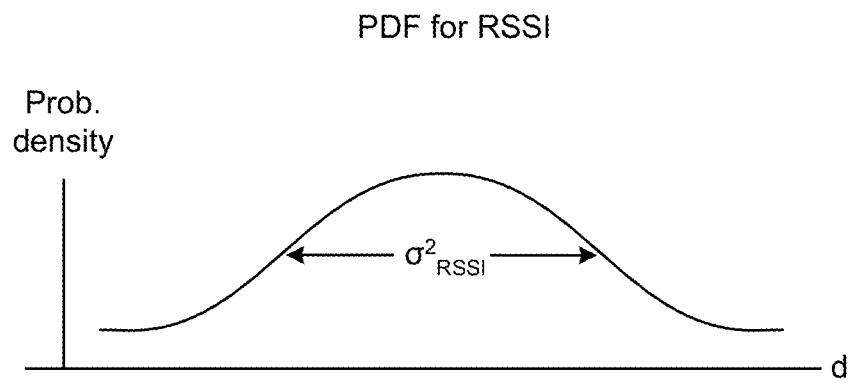
FIGS. 4 and 5 compare relative uncertainties of RSSI and RTT measurements.
Figure 5:
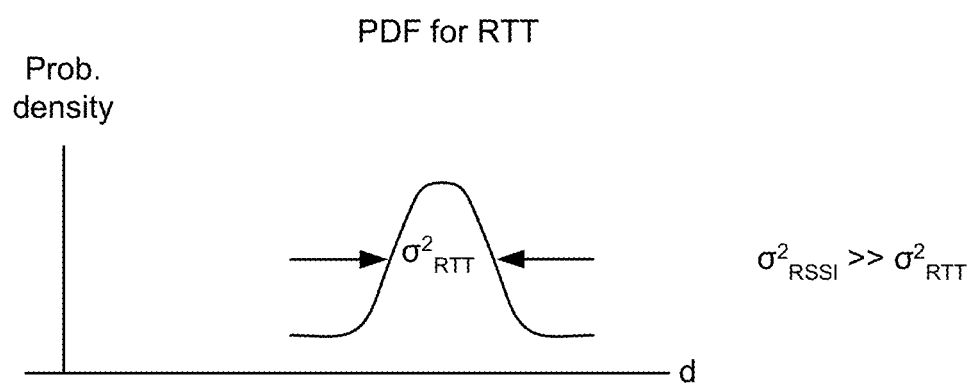

FIGS. 4 and 5 compare relative uncertainties of RSSI and RTT measurements. In FIG. 4, a probability density function (PDF) is shown for RSSI measurements converted from power [dBm] to range [m]. The PDF is represented by a standard deviation ($\sigma_{RSSI}$) or variance ($\sigma^2_{RSSI}$) of the RSSI measurements. In FIG. 5, a PDF is shown for RTT measurements converted from time [s] to range [m]. The RTT measurements are represented by a standard deviation ($\sigma_{RTT}$) or variance ($\sigma^2_{RTT}$) of the RTT measurements. As shown, the range estimate uncertainty of the RSSI variance is much larger than that of the RTT variance. Therefore, if RTT measurements are available, RTT may provide a position estimate with more accuracy (or less uncertainty) than the RSSI measurements. In equation form, the variances are compared with ($\sigma^2_{RSSI} \gg \sigma^2_{RTT}$).

FIGS. 6 to 11 show various standard and non-standard implementations of CSD modes. In FIG. 6 tabulates recommended CSD modes. A first mode (CSD mode 1) disables CSD and uses only one transmitter. The remaining modes enable CSD. A second mode (CSD mode 2) uses two transmitters space apart by 200 nanoseconds (ns). The first transmitter transmits the original signal with no temporal shift. The second transmitter advances the original signal by the 200 ns and wraps the final 200 ns as the first 200 ns. A third mode (CSD mode 3) uses three transmitters each temporally spaced apart by 100 ns. The first transmitter transmits the original signal with 0 ns of cyclic shift. The second transmitter transmits the original signal with a 100 ns cyclic shift. The third transmitter transmits the original signal with a 200 ns cyclic shift. A fourth mode (CSD mode 4) uses four transmitters each temporally spaced apart by 50 ns. The first transmitter transmits the original signal with 0 ns of cyclic shift. The second transmitter transmits the original signal with a 50 ns cyclic shift. The third transmitter transmits the original signal with a 100 ns cyclic shift. The fourth transmitter transmits the original signal with a 150 ns cyclic shift. Additional modes may be defined in the future. In addition, an access point or mobile phone manufacturer may customize a CSD mode by defining a number of transmitters and a temporal spacing between transmitters.

Figure 7:
Figure 8:
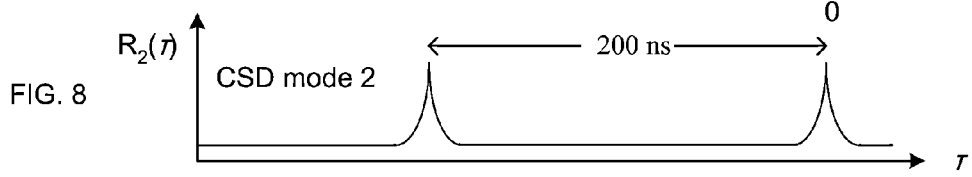
Figure 9:
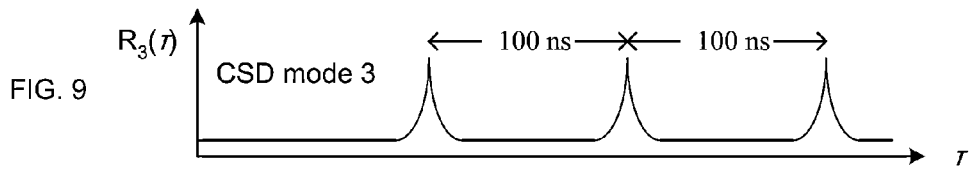
Figure 10:
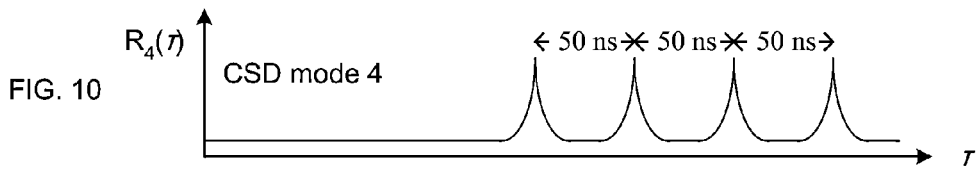
Figure 11:
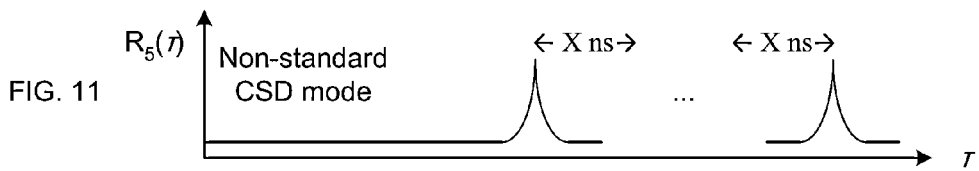

In FIG. 7, an autocorrelation $R_1(\tau)$ of a received signal transmitted using CSD mode 1 is shown. The autocorrelation includes a single peak centered about $\tau=0$. In FIG. 8, an autocorrelation $R_2(\tau)$ of a received signal transmitted using CSD mode 2 is shown. The autocorrelation includes two peaks centered about $\tau=0$ and $\tau=-200$ ns. In FIG. 9, an autocorrelation $R_3(\tau)$ of a received signal transmitted using CSD mode 3 is shown. The autocorrelation includes three peaks centered about $\tau=0$, $\tau=-100$ and $\tau=-200$ ns. In FIG. 10, an autocorrelation $R_4(\tau)$ of a received signal transmitted using CSD mode 4 is shown. The autocorrelation includes four peaks centered about $\tau=0$, $\tau=-50$, $\tau=-100$ and $\tau=-150$ ns. In FIG. 11, an autocorrelation $R_5(\tau)$ of a non-standard received signal transmitted using CSD mode 5 is shown. The autocorrelation includes n peaks spaced by X ns.

Figure 12:
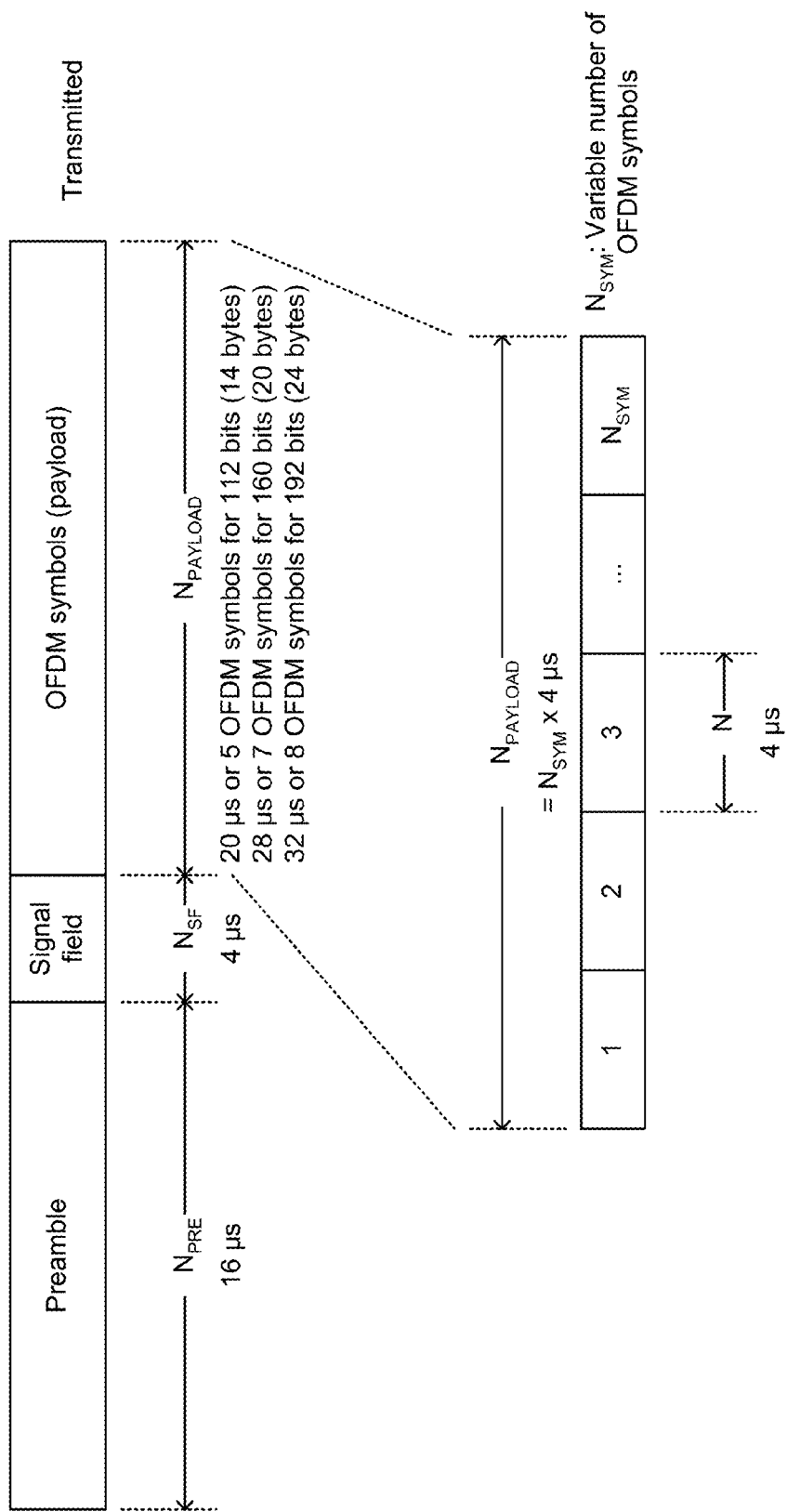
FIGS. 12 to 18 show the structure for transmission of OFDM symbols with and without cyclic shifting.

FIGS. 12 to 18 show the structure for transmission of OFDM symbols with and without cyclic shifting. In FIG. 12, a transmitted OFDM signal is shown. The OFDM signal includes a preamble ($N_{PRE}=16$ μs) and a signal field ($N_{SF}=4$ μs), followed by a payload comprising OFDM symbols ($N_{PAYLOAD}=20$ μs, 28 μs or 32 μs for a variable number of OFDM symbols $N_{SYM}=5$, 7 or 8, respectively). Five OFDM symbols are represented by 112 bits or 14 bytes. Seven OFDM symbols are represented by 160 bits or 20 bytes. Eight OFDM symbols are represented by 192 bits or 24 bytes. One OFDM symbol is N=4 μs long.

Figure 13:
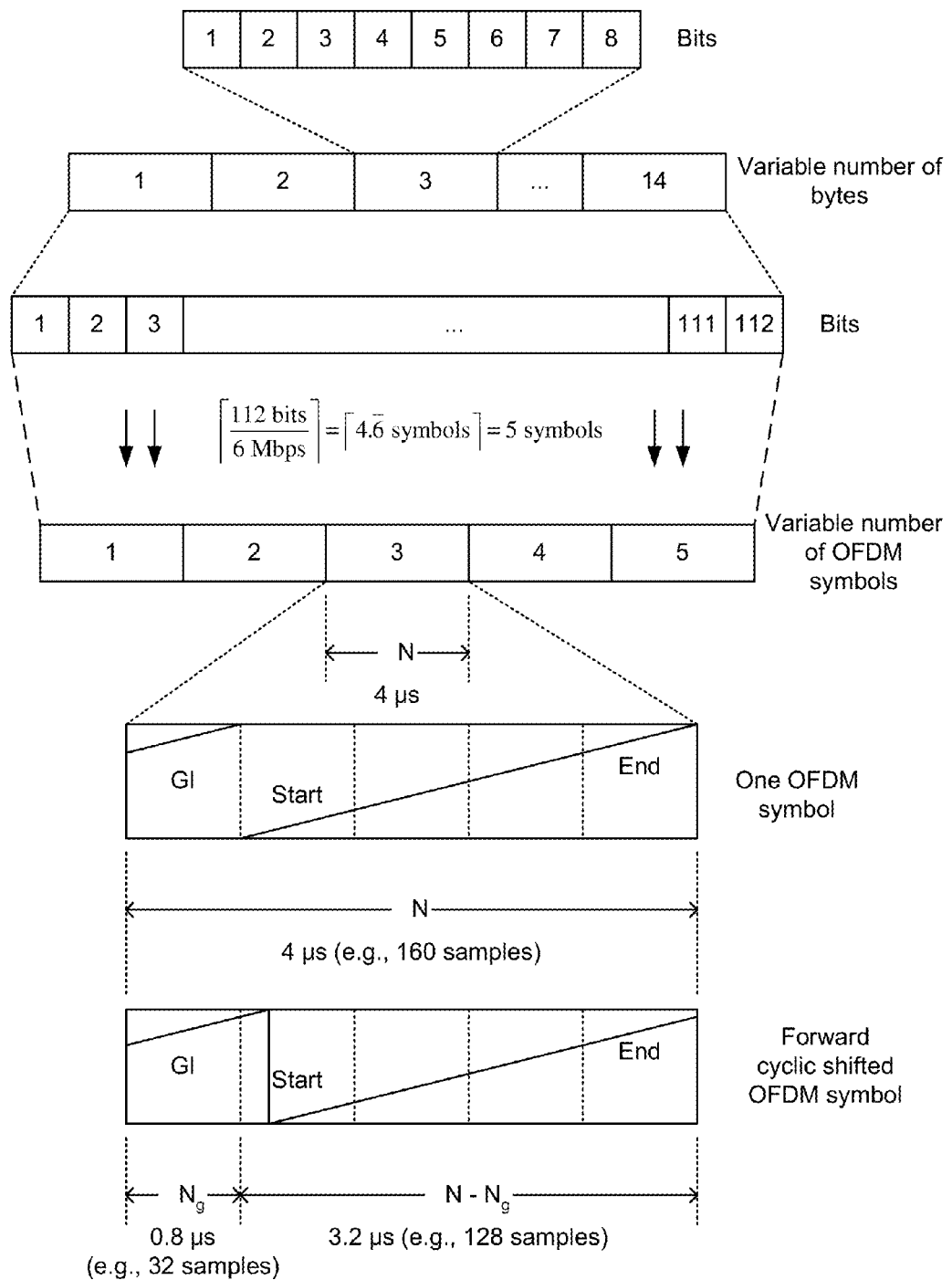

In FIG. 13, a structure of OFDM symbols is shown. A variable number of OFDM symbols are created from a variable number of 8-bit bytes. In the example shown, 14 8-bit bytes or 112 bits need to be transmitted at 6 Mbps. To determine the number of OFDM symbols required, the division of 112 bits by 6 Mbps is rounded up to an integer number of symbols from 4.667 symbols to 5 OFDM symbols. Each OFDM symbol (of duration N=4 μs or 160 samples) includes a guard interval (GI) of 1 section long along with the information ($N_g=0.8$ μs or 32 samples from start to end) comprising for 4 sections totaling 5 sections. The GI ($N-N_g=3.2$ μs or 128 samples) is created from copying the end second of the information. Also shown is a forward cyclic shifted OFDM symbol. The cyclic shifted OFDM symbol is shown shifted by 200 ns for a CSD mode 2. Therefore, a first transmitter transmits the OFDM symbol and a second transmitter transmits the cyclic shifted OFDM symbol.

Figure 14:
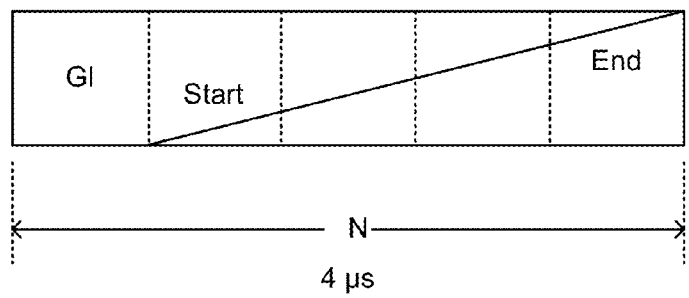
Figure 15:
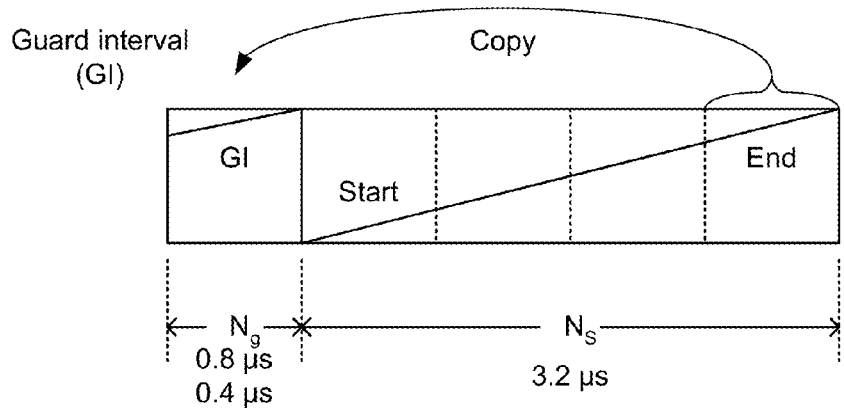
Figure 16:
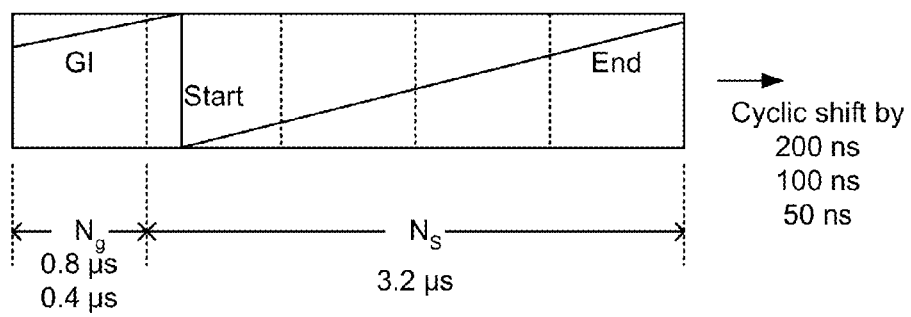

FIGS. 14-18 show the process of creating a guard interval (GI) and a cyclic shift delay (CSD) in more detail. In FIG. 14, an OFDM symbol is shown of duration N=4 μs. The OFDM symbol includes a GI and information. In FIG. 15, a process to create the GI is shown by copying the end of the information as the GI. The GI is one of two lengths ($N_g$=0.4 μs or 0.8 μs). The information is $N_s$=3.2 μs long. In FIG. 16, a first cyclic shifted symbol shifted by 200 ns (CSD mode 2), 100 ns (CSD mode 3) or 50 ns (CSD mode 4) may be imposed on the previous figure.

Figure 17:
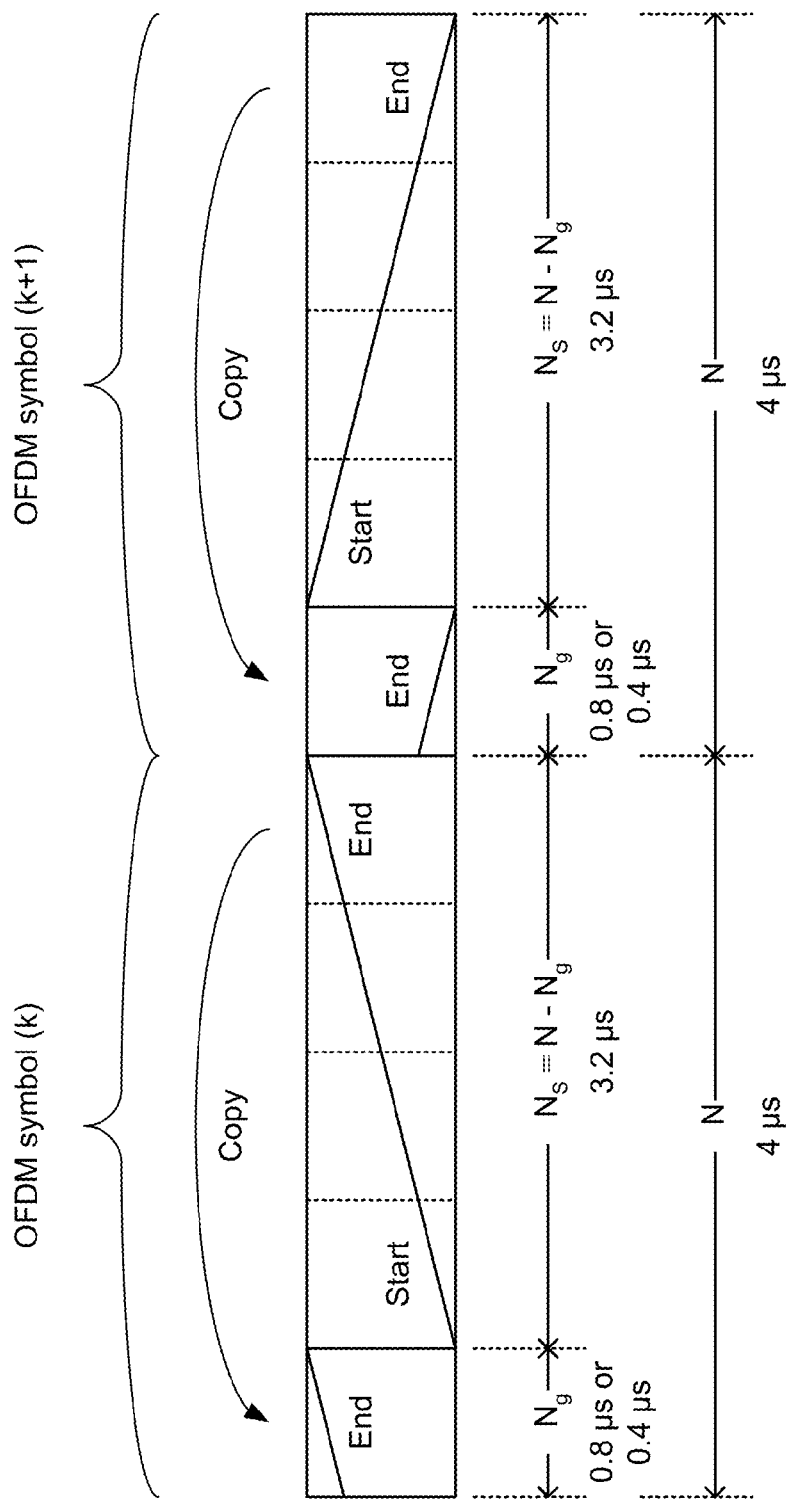
Figure 18:
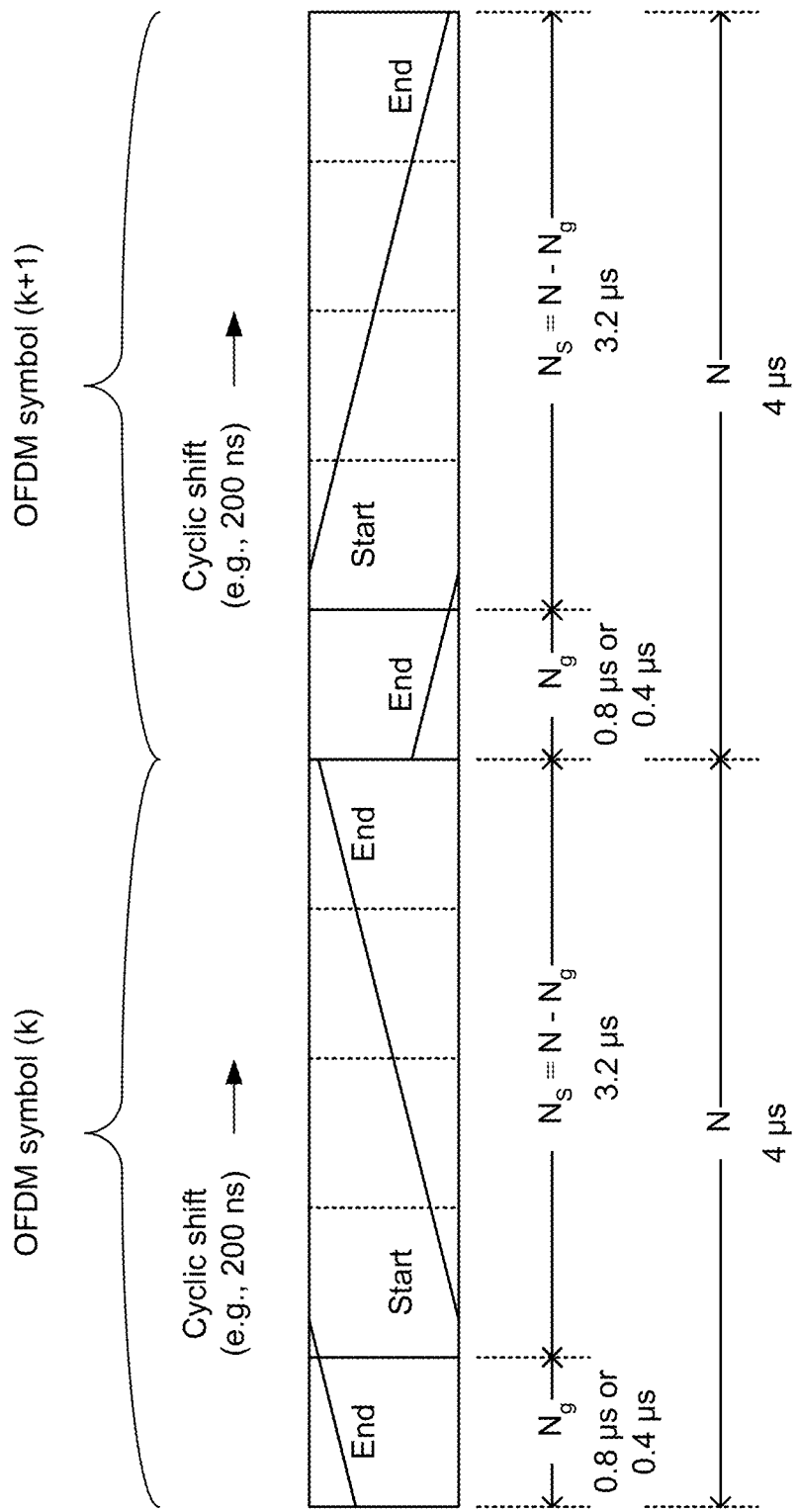

In FIG. 17, two successive OFDM symbols (k and k+1) for a first transmitter are shown. In FIG. 18, two successive OFDM symbols (k and k+1) having a cyclic shift of 200 ns for a second transmitter are shown.

Figure 19:
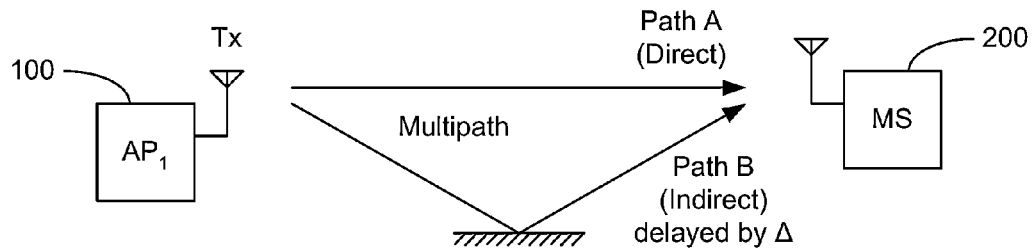
FIGS. 19 to 22 illustrate effects of multipath.
Figure 20:
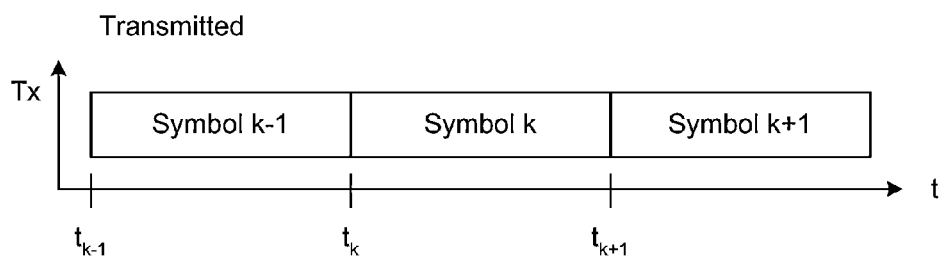
Figure 21:
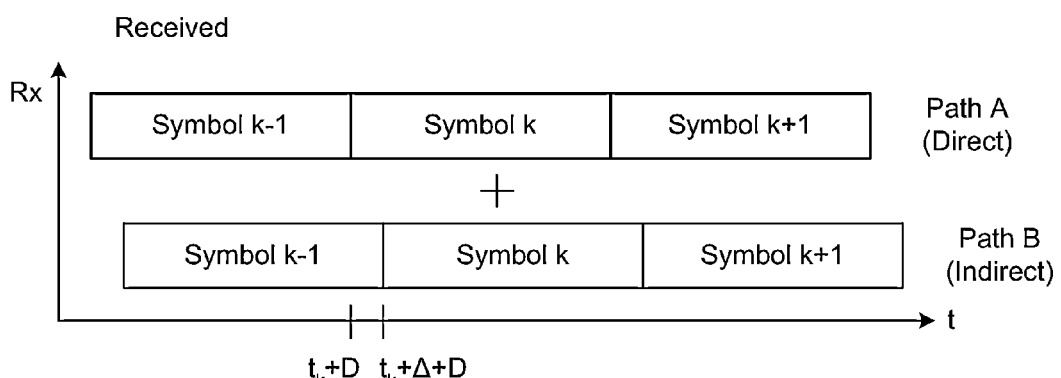
Figure 22:
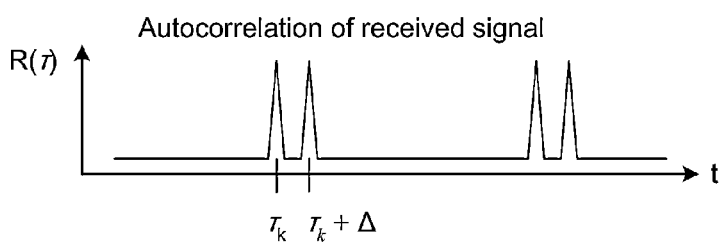

FIGS. 19 to 22 illustrate effects of multipath. In FIG. 19, an access point ($AP_1$ 100) transmits a single signal. The signal follows a direct path (Path A) and an indirect path (Path B) to a receiver at MS 200. The signal following the indirect path causes a delay of Δ when compared to the direct path signal. In FIG. 20, the transmission of three sequential symbols is shown. A first symbol k−1 is followed by a second symbol k, which is followed by a third symbol k+1 at times $t_{k-1}$, $t_k$ and $t_{k+1}$, respectfully. In FIG. 21, the three symbols are received along two paths: the direct path (Path A) and the indirect path (Path B). Along the direct path, symbol k is received at $t_k$+D, where $t_k$ is the time symbol k was transmitted and D is the travel time. Along the indirect path, symbol k is received at $t_k$+Δ+D, where Δ is the time difference between the indirect path and the direct path. In FIG. 22, an autocorrelation R(τ) of the received signal of FIG. 21 is shown. A pair of correlation peaks spaced apart by Δ occurs for each OFDM symbol. As will be explained below, the pair of correlation peaks may be interpreted as a CSD mode 1 signal.

Figure 23:
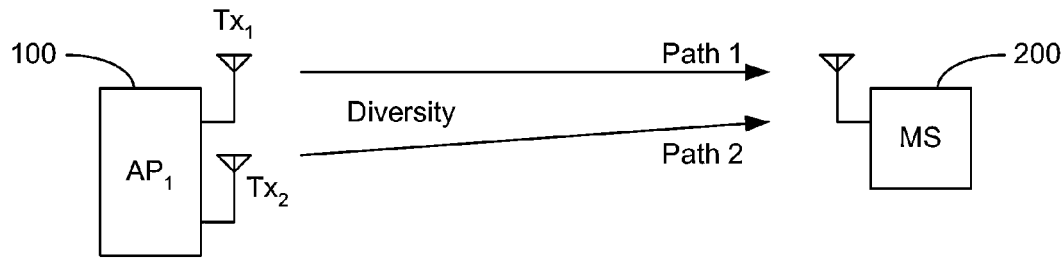
FIGS. 23 to 26 illustrate effects of cyclic shift diversity.
Figure 24:
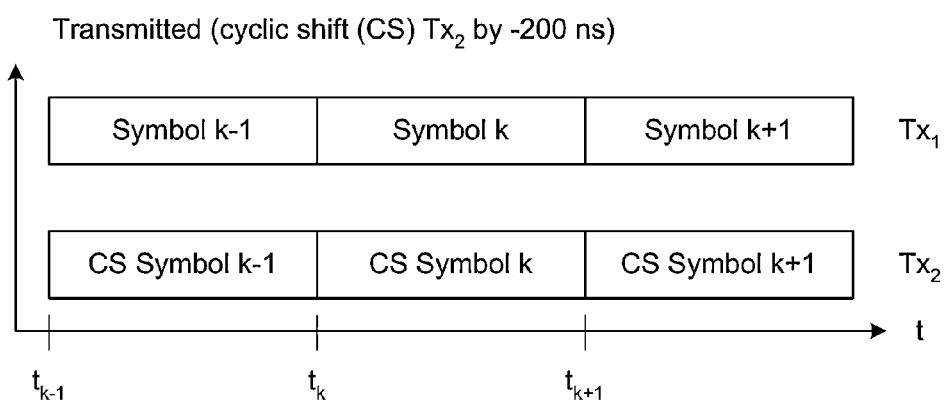
Figure 25:
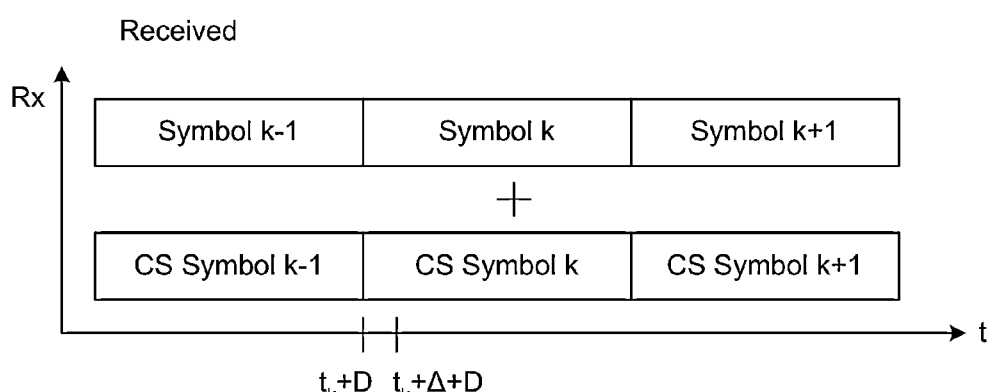

FIGS. 23 to 26 illustrate effects of cyclic shift diversity. In FIG. 23, two direct paths are shown. The $AP_1$ includes a first transmitter $Tx_1$ transmitting a first signal to MS 200 along a first path (Path 1) and a second transmitter $Tx_2$ transmitting a second signal to MS 200 along a second path (Path 2). The time delay Δ between the two paths is assumed to be zero. In this case, the first signal is an original signal and the second signal is a cyclic shifted signal. In FIG. 24, three symbols of the two signals are shown. The first signal includes three symbols (symbol k−1, symbol k and symbol k+1) from the first transmitter $Tx_1$ and the second signal includes cyclic shifted versions of the same symbols (CS symbol k−1, CS symbol k and CS symbol k+1) but cyclic shifted by −200 ns from the second transmitter $Tx_2$. The three symbols are transmitted at $t_{k-1}$, $t_k$ and $t_{k+1}$. In FIG. 25, the two signals are received as an overlapping signal. Because Δ is assumed to be zero, each symbol and cyclic shifted version of the symbol are received at the same time $t_k$+D, where $t_k$ represents the transmit time and D represents the delay of travel time.

Figure 26:
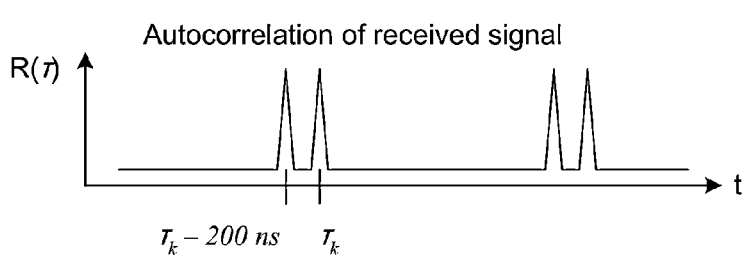

In FIG. 26, an autocorrelation R(τ) of the received signal of FIG. 25 is shown. A pair of correlation peaks spaced apart by 200 ns occurs for each OFDM symbol. The pair of correlation peaks may be interpreted as a CSD mode 1 signal because two peaks exist that are spaced 200 ns apart. Above in FIG. 22, if Δ is 200 ns, then the autocorrelation of FIG. 22 of the multipath signal may erroneously be interpreted as a cyclic shift of −200 ns and a CS mode 1.

FIGS. 27 to 34 define a first method to determine a CSD mode by signaling CSD information between an access point and a mobile device, in accordance with some embodiments of the present invention. In the first method, a CSD mode is communicated by signaling from the network side to the mobile device.

The CSD mode may be represented by: (1) a CSD mode from the IEEE 802.11n specification; (2) a number of transmitters; (3) a cyclic shift (temporal) spacing between transmitters; (4) criteria for enabling/disabling a CSD mode; or (5) any combination of two or more of these representations (e.g., a number of transmitters plus a spacing between transmitters).

In FIG. 27, a server signals the current CSD mode from the server to the mobile device. FIG. 28 shows a signaling message containing a number of transmitters used for cyclic shift operations. FIG. 29 shows a signaling message containing a cyclic shift (temporal) spacing between transmitters (e.g., 50, 100 or 200 ns). FIG. 30 shows a signaling message containing criteria for enabling/disabling a CSD mode.

Figure 31:
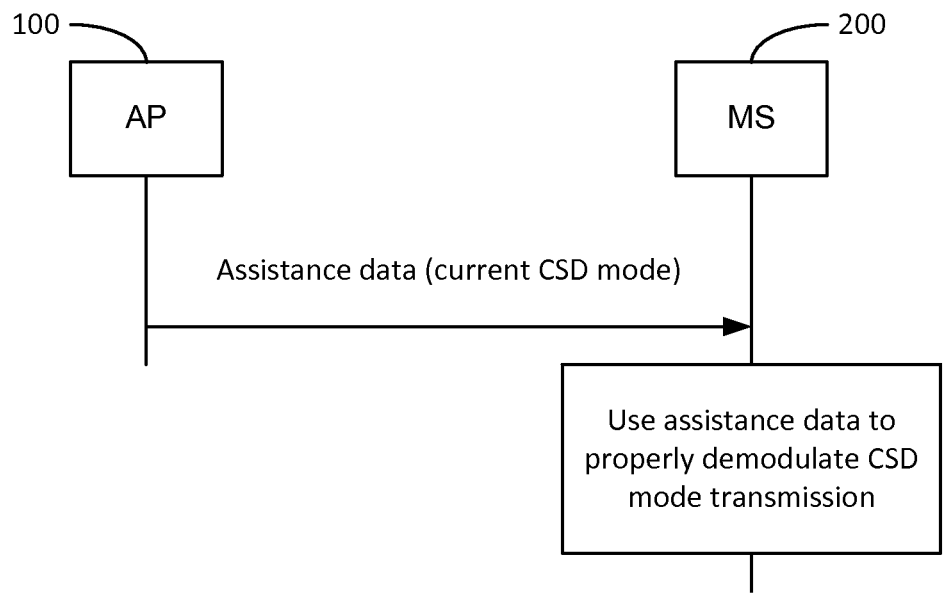
Figure 32:
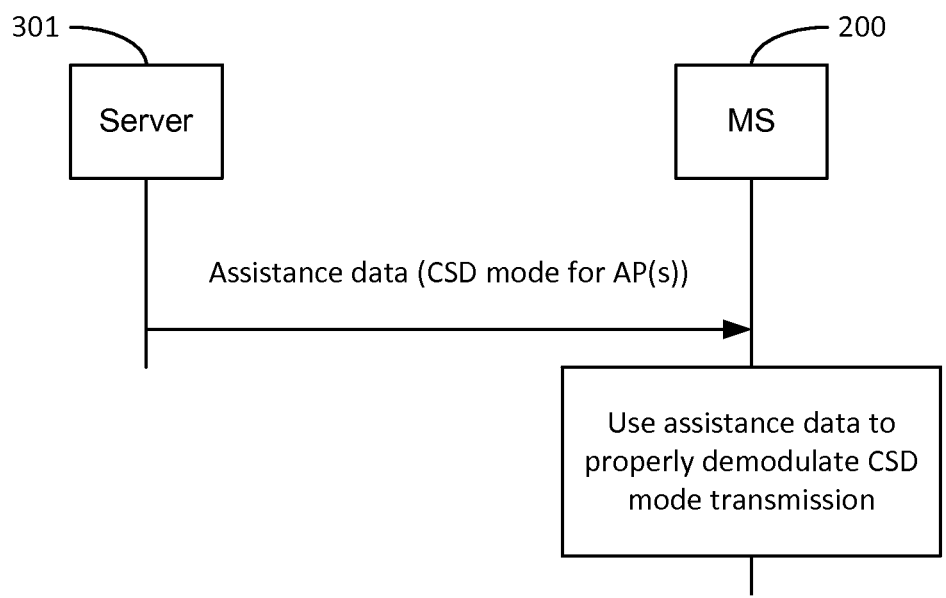

In FIG. 31, AP 100 sends a signaling message containing assistance data identifying the current CSD mode to MS 200. MS 200 uses the assistance data to properly demodulate the CSD mode transmission. In FIG. 32, a server 301 sends the assistance data, including which CDS mode in operational for each AP, to MS 200. Again, MS 200 uses the assistance data to properly demodulate the CSD mode transmission.

Figure 33:
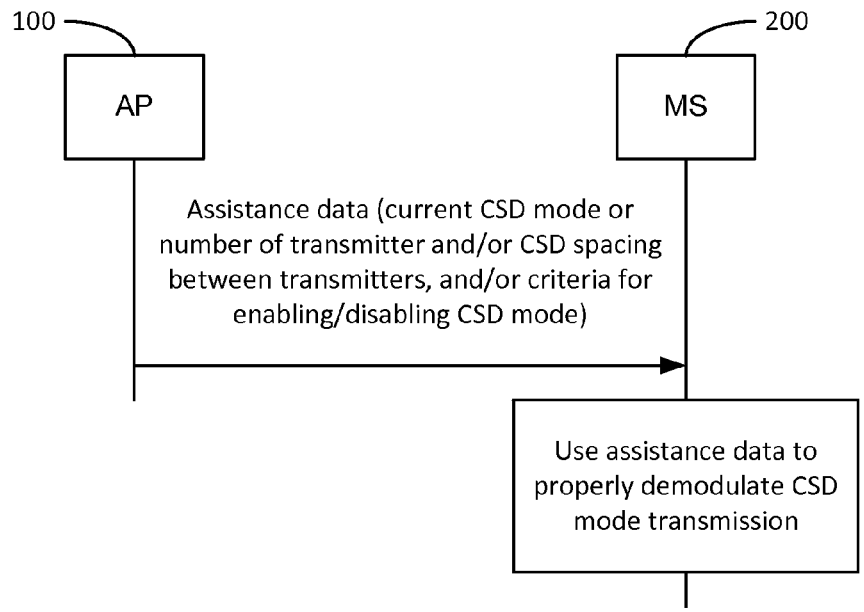

FIG. 33 shows a combination of two or more of the above representations, AP 100 sends a signaling message containing assistance data to MS 200. The assistance data include: (1) the current CSD mode; (2) a number of transmitters; (3) the temporal cyclic shift delay spacing between transmitters; and/or (4) criteria for enabling or disabling a CSD mode. As before, MS 200 uses the assistance data to properly demodulate the CSD mode transmission.

Figure 34:
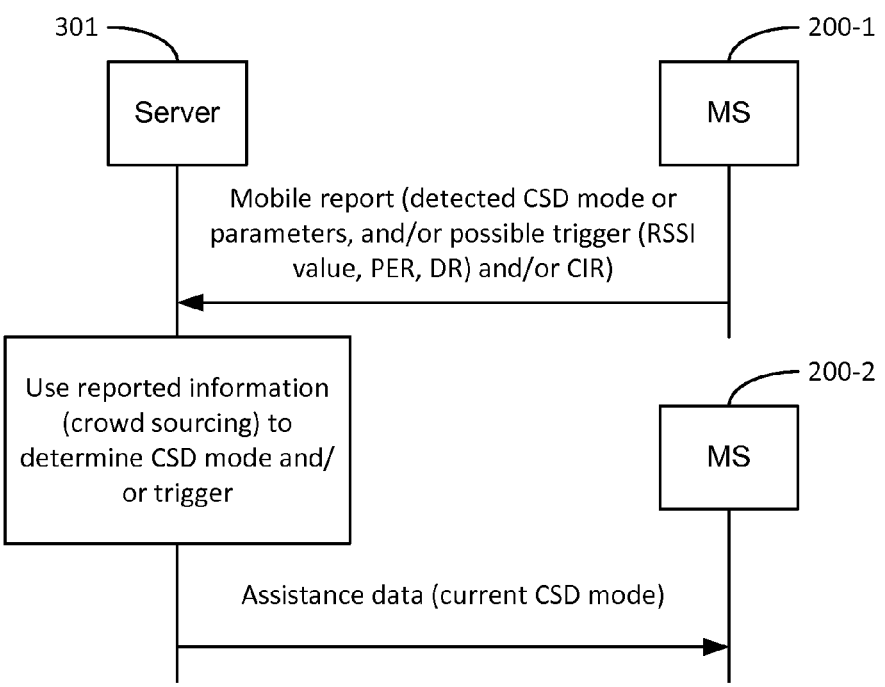

FIG. 34 shows crowd sourcing. In crowd sourcing, one or more mobile devices determine what CSD mode is being used and report this information to the server. The mobile device may also relay other information about the current signaling conditions so the server may try to determine what criteria is being used to enable and disable CSD. A first mobile (MS 200-1) or a plurality of mobiles each send to a server 301 a mobile report including a detected CSD mode, detected CSD parameters, parameters that an access point might use for a trigger (e.g., RSSI value, packer error rate (PER), data rate (DR), or the like) and/or a channel impulse response (CIR). The server 301 uses this reported information as crowd sourcing to determine a current CSD mode and/or trigger. Next, the server 301 sends assistance data, including this current CSD mode and/or the trigger, to a second mobile (MS 200-2).

The signaling may be a unique and separate message or may be part of an existing message, such as part of an assistance data message. This signaling may originate in an access point, or alternatively, this signaling may originate from a server. A server may be instructed what CSD mode is currently being used, for example, by a network operator. Alternatively, crowd sourcing may be used to determine what CSD mode is currently being used.

FIGS. 35 to 54 show how to determine a CSD mode by using a combination of delay-based autocorrelation and cyclic shift-based autocorrelation, in accordance with some embodiments of the present invention.

FIG. 35 shows a CSD mode determination by comparing a difference between two autocorrelations to a threshold. A first autocorrelation that is a delay-based autocorrelation 602 and a second autocorrelation that is a cyclic shift-based autocorrelation 604. A received OFDM signal y(t) is used as an input to both correlators. A summer 606 takes a difference between the autocorrelation outputs and provides the difference as a correlation output to a threshold comparison circuit 608. The correlation output is compared to a threshold to derive a current CSD mode.

FIG. 36 defines a delay-based autocorrelation. The delay-based autocorrelation attempts to determine if a multipath has adversely affected the received OFDM signal. In some embodiments, a delay-based autocorrelation R(τ) is defined as:

$$R_{delay}^k(\tau) = \sum_{i=N_g+N_S-N_C+1}^{N_g+N_S} y(i)y^*(i+\tau),$$

or $$R_{delay}^k(\tau) =$$

$$\sum_{i=N_g+N_S-N_C+1}^{N_g+N_S-\tau} y_k(i)y_k^*(i+\tau) + \sum_{i=N_g+N_S-\tau+1}^{N_g+N_S} y_k(i)y_{k+1}^*(i+\tau-N_g-N_S).$$

As can be seen, a delay-based correlation does not take any cyclic shifting into consideration.

FIG. 37 defines a cyclic shift-based autocorrelation. The cyclic shift-based autocorrelation attempts to determine if an enabled CSD mode has affected the received OFDM signal. In some embodiments, a cyclic shift-based autocorrelation $R(\tau)$ is defined as:

$$R_{CS}^k(\tau) = \sum_{i=N_g+N_S-N_C+1}^{N_g+N_S-\tau} y_k(i)y_k^*(i+\tau) + \sum_{i=N_g+N_S-\tau+1}^{N_g+N_S} y_k(i)y_k^*(i+\tau-N_S).$$

Figure 38:
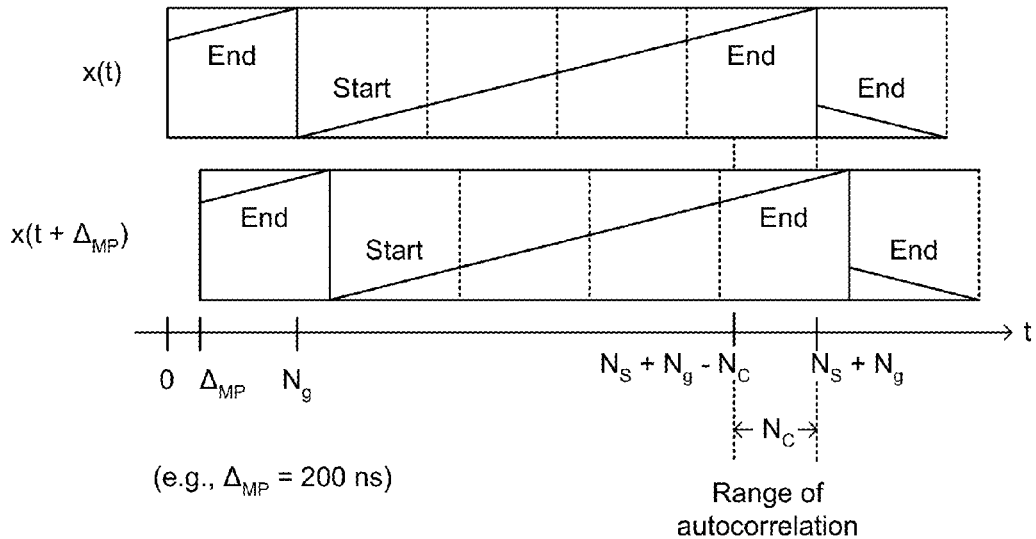
Figure 39:
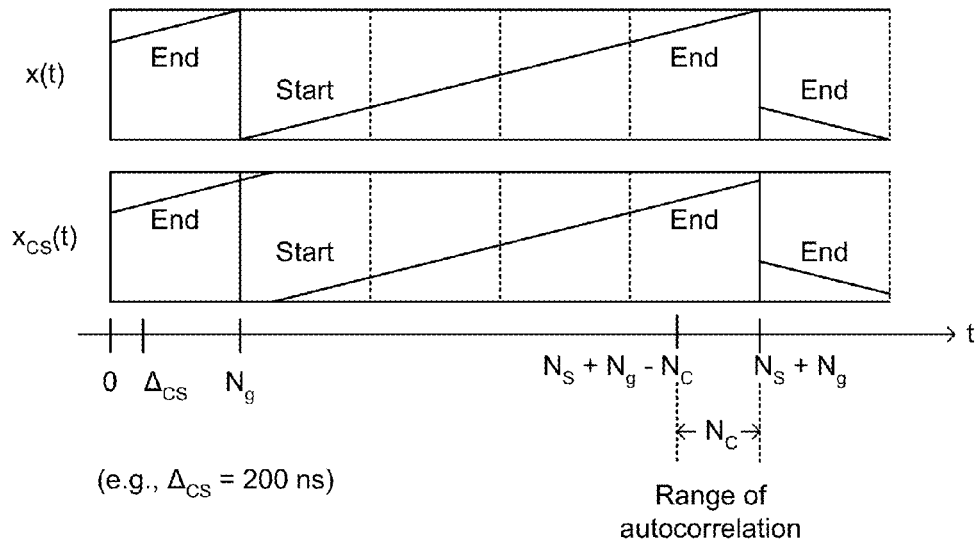

FIGS. 38 and 39 show a range ($N_C$) for use in each autocorrelation on a multipath signal and a cyclic shift signal, respectively. In FIG. 38, a received signal experiences multipath, such that $y(t)=x(t)+x(t+\Delta_{MP})$. The multipath signal is delayed by $\Delta_{MP}$. The end of the indirect path signal $x(t+\Delta_{MP})$ is delayed such that the guard interval of the next symbol on the direct path signal interferes. The range of the autocorrelation excludes this overlapping region. Specifically, the beginning of the direct path signal $x(t)$ is received at time zero. The beginning of the indirect path signal $x(t+\Delta_{MP})$ is received at time $\Delta_{MP}$. In a worse case, the multipath delay $\Delta_{MP}$ is 200 ns. The end of the guard interval of the direct path signal is received at $N_g$. The end of a symbol of the direct path occurs at $N_S+N_g$, where $N_S$ is the symbol length and $N_g$ is the guard interval length. The range $N_C$ is set to end at $N_S+N_g$. The beginning is at $N_S+N_g-N_C$. The width of $N_C$ is variable.

In FIG. 39, a received signal y(t) is the sum of two direct path cyclic shifted signals. That is, $y(t)=x(t)+x_{CS}(t)$, with the beginning of a symbol for each signal occurring at zero. The non-shifted signal is represented by $x(t)$ and the cyclic shifted signal is represented by $x_{CS}(t)$. In this case, the cyclic shift is $\Delta_{CS}=200$ ns.

A worst case for multipath is multipath that cause two different received signals to be delayed by 200 ns, three different received signals to be delayed by 100 ns, or three different received signals to be delayed by 50 ns each. These versions of multipath appear as coming from a cyclic shift delay system and are considered below.

Figure 40:
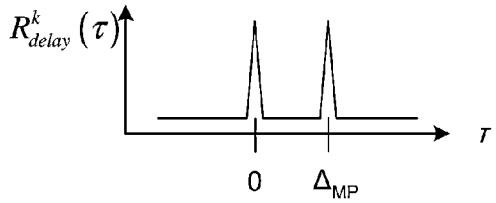
Figure 41:
Figure 42:
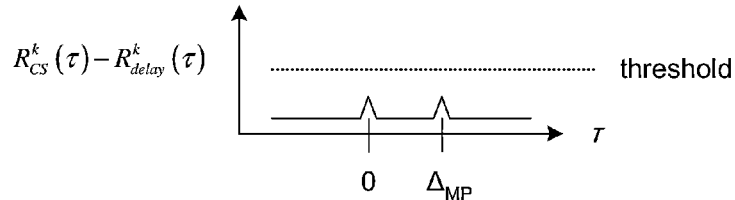

A multipath signal y(t) is considered. FIG. 40 shows the output of a delay-based autocorrelator $R(\tau)$ when a multipath signal y(t) is received. In this example, the multipath signal y(t) arrives along two different paths (e.g., a direct path and an indirect path). The resulting delay-based autocorrelation of a multipath signal shows two peaks. FIG. 41 shows the output of a cyclic shift-based autocorrelator when the same multipath signal y(t) is received. The resulting cyclic shift-based autocorrelation of a multipath signal also shows two peaks indistinguishable from the delay-based autocorrelator output. FIG. 42 shows a difference between the two autocorrelators for a multipath signal y(t). The difference has no peak above a threshold.

Figure 43:
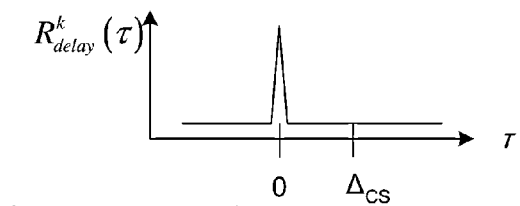
Figure 44:
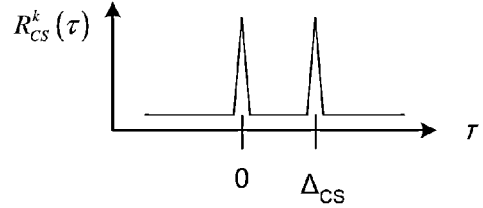
Figure 45:
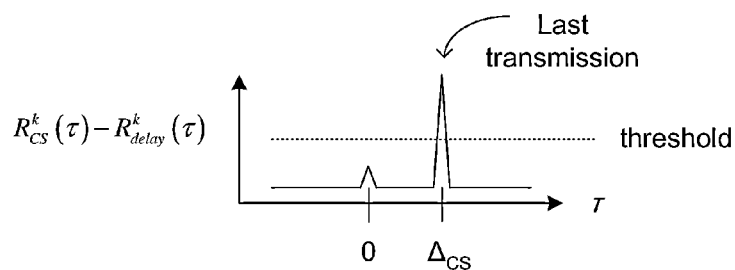

A cyclic-shift signal y(t) is considered. FIG. 43 shows the output of a delay-based autocorrelator when a cyclic-shift signal y(t) is received. In this example, two transmitters are transmitting similar signals (one the cyclic shift of the other) using a CSD mode (e.g., CSD mode 2). The resulting output shows a single correlation peak. FIG. 44 shows the output of a cyclic shift-based autocorrelator when the same cyclic-shift signal y(t) is received. The resulting output shows two correlation peaks. FIG. 45 shows a difference between the two autocorrelators for the cyclic-shift signal y(t). The difference has one peak above a threshold.

Therefore, by comparing the outputs of a delay-based autocorrelator and a cyclic shift-based autocorrelator, one may differentiate between a multipath signal and a cyclic shift signal. That is, when the autocorrelators differ above a threshold, a cyclic shift signal is received.

In sum, for purely multipath signals, the output of the delay-based autocorrelator is similar to the output of the cyclic shift-based autocorrelator. For purely cyclic-shift signals, however, the output of the delay-based autocorrelator significantly differs from the output of the cyclic shift-based autocorrelator. Once the difference is detected, the number of transmitters may be identified from the number of peaks (e.g., 2, 3 or 4) above a threshold in the output results from the cyclic-shift autocorrelator. The temporal difference between successive peaks identifies the cyclic-shift delay between signals (e.g., 50 ns, 100 ns or 200 ns).

The same analysis applied above to a two-path multipath signal and a CSD mode 2 signal is now applied to a three-path multipath signal and a CSD mode 3 signal.

FIGS. 46 to 51 show the same graphs as shown in FIGS. 40 to 45, however, the received signal has either an additional multipath from a third signal path or an additional CSD transmitted signal from a third transmitter.

Figure 46:
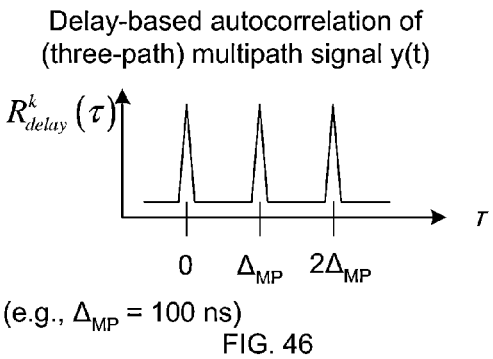
Figure 47:
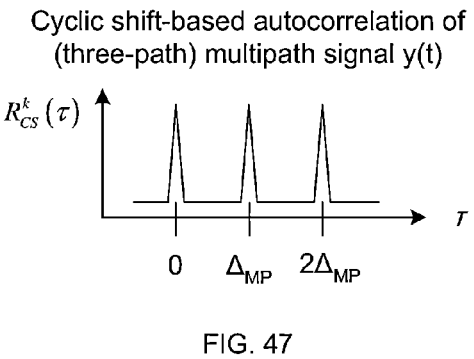
Figure 48:

A multipath signal y(t) having a direct path and two indirect paths is considered. FIG. 46 shows the output of a delay-based autocorrelator $R(\tau)$ when a multipath signal y(t) is received. In this example, the multipath signal y(t) arrives along three different paths (e.g., a direct path and two indirect paths). The resulting delay-based autocorrelation of the multipath signal shows three peaks. FIG. 47 shows the output of a cyclic shift-based autocorrelator when the same multipath signal y(t) is received. The resulting cyclic shift-based autocorrelation of a multipath signal also shows three peaks indistinguishable from the delay-based autocorrelator output. FIG. 48 shows a difference between the two autocorrelators for a multipath signal y(t). The difference has no peak above a threshold.

Figure 49:
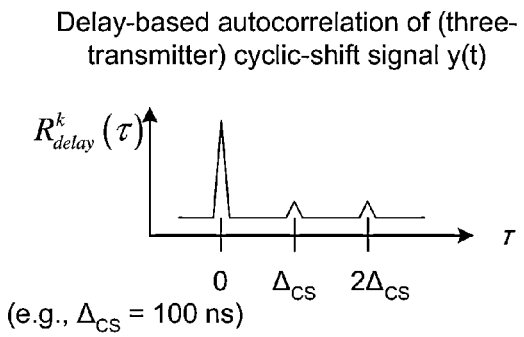
Figure 50:
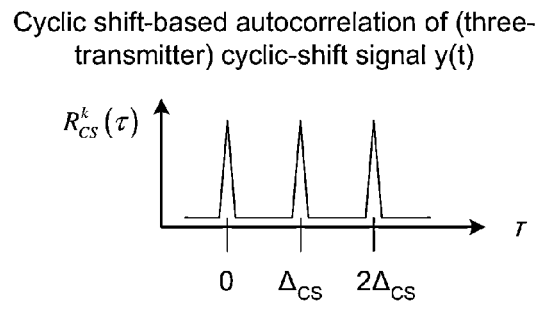
Figure 51:
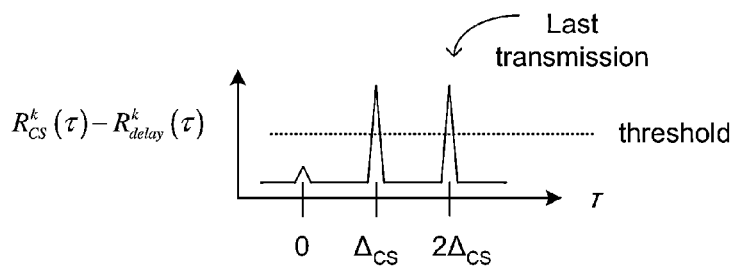

A cyclic-shift signal y(t) is considered. FIG. 49 shows the output of a delay-based autocorrelator when a cyclic-shift signal y(t) using CSD mode 3 is received. In this example, three transmitters are transmitting similar signals (two signals a cyclic shift of the first signal) using CSD mode 3. The resulting output shows two correlation peaks. FIG. 50 shows the output of a cyclic shift-based autocorrelator when the same cyclic-shift signal y(t) is received. The resulting output shows three correlation peaks. FIG. 51 shows a difference between the two autocorrelators for the cyclic-shift signal y(t). The difference has two peaks above a threshold.

Figure 52:
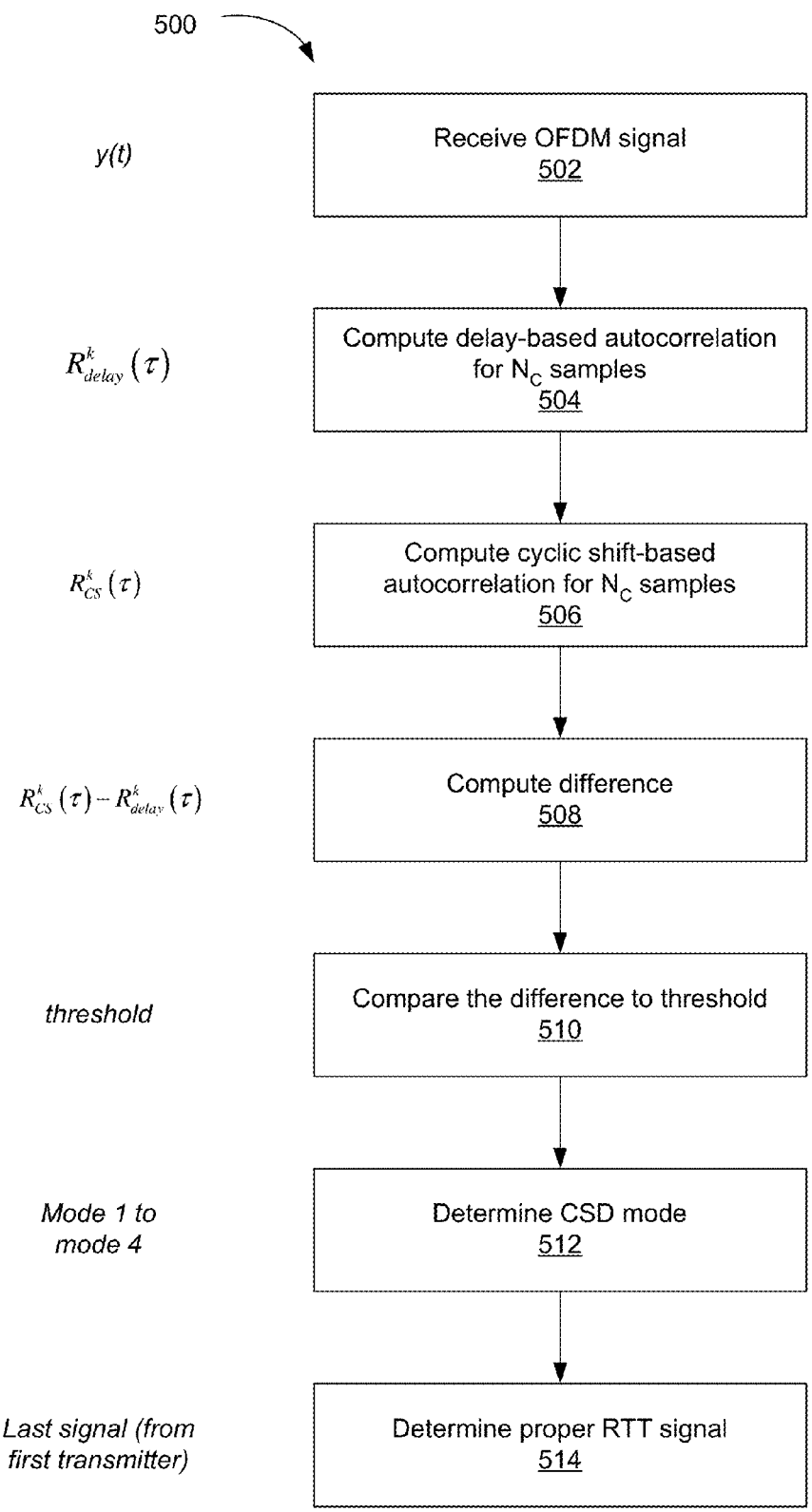

FIG. 52 shows a method 500 to determine a current CSD mode from a received OFDM signal y(t). At 502, a processor receives an OFDM signal y(t). At 504, the processor computes a delay-based autocorrelation $R_{delay}^k(\tau)$ for $N_C$ samples. At 506, the processor computes a cyclic shift-based autocorrelation $R_{CS}^k(\tau)$ for $N_C$ samples. Steps 504 and 506 may be performed in either order or in parallel. At 508, the processor computes a difference $R_{CS}^k(\tau)-R_{delay}^k(\tau)$. At 510, the processor compares the difference to a threshold. At 512, the processor determines if CSD is enable and what CSD mode is enables. At 514, the processor determines a proper RTT signal used for position estimates. The proper signal to use for RTT is the last-in-time signal or the signal transmitted from the first transmitter without a cyclic shift.

Figure 53:
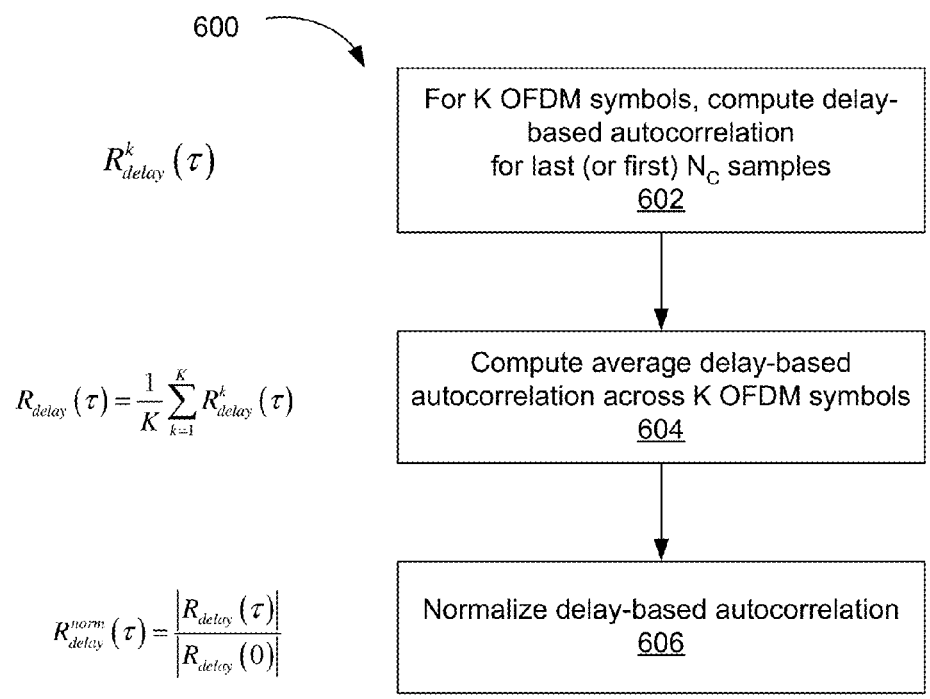
Figure 54:
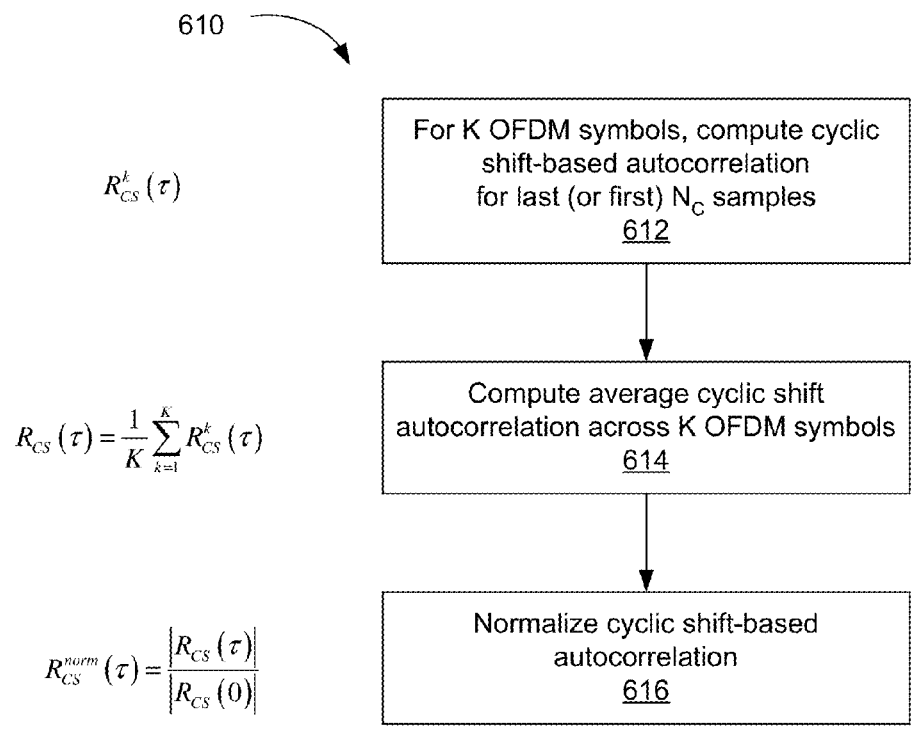

FIGS. 53 and 54 show how to take an average correlation over time to provide a normalized autocorrelation.

In FIG. 53, a method 600 to normalize a delay-based autocorrelation is shown. At 602, a processor computes a delay-based autocorrelation $R_{delay}^{k}(\tau)$, for each of K OFDM symbols, across the last $N_C$ samples. Alternatively, the first $N_C$ samples may be examined. Next at 604, the processor computes an average delay-based autocorrelation across the K OFDM symbols, for example, as $$R_{delay}(\tau) = \frac{1}{K}\sum_{k=1}^{K} R_{delay}^{k}(\tau).$$

Finally at 606, the processor computes a normalized delay-based autocorrelation, for example, as $$R_{delay}^{norm}(\tau) = \frac{|R_{delay}(\tau)|}{|R_{delay}(0)|}.$$

In FIG. 54, a method 610 to normalize a cyclic shift-based autocorrelation is shown. At 612, a processor computes a cyclic shift-based autocorrelation $R_{CS}^{k}(\tau)$, for each of K OFDM symbols, across the last $N_C$ samples. Alternatively, the first $N_C$ samples may be examined. Next at 614, the processor computes an average cyclic shift-based autocorrelation across the K OFDM symbols, for example, as $$R_{CS}(\tau) = \frac{1}{K}\sum_{k=1}^{K} R_{CS}^{k}(\tau).$$

Finally at 616, the processor computes a normalized delay-based autocorrelation, for example, as $$R_{CS}^{norm}(\tau) = \frac{|R_{CS}(\tau)|}{|R_{CS}(0)|}.$$

FIGS. 55 to 60 illustrate another method to determine a CSD mode by using a channel impulse response calculation, in accordance with some embodiments of the present invention. A CSD mode is determined by examining local maxima above a threshold in a channel impulse response of a received OFDM signal.

The number of local maxima or peaks above a threshold in a channel impulse response determines the number of CSD transmitters. The temporal spacing of the CSD transmitters is determined by finding the time difference between these peaks. By tabulating the number of local peaks and their time spacing over time after several OFDM symbol periods, one may determine what CSD mode is currently being used.

Figure 55:
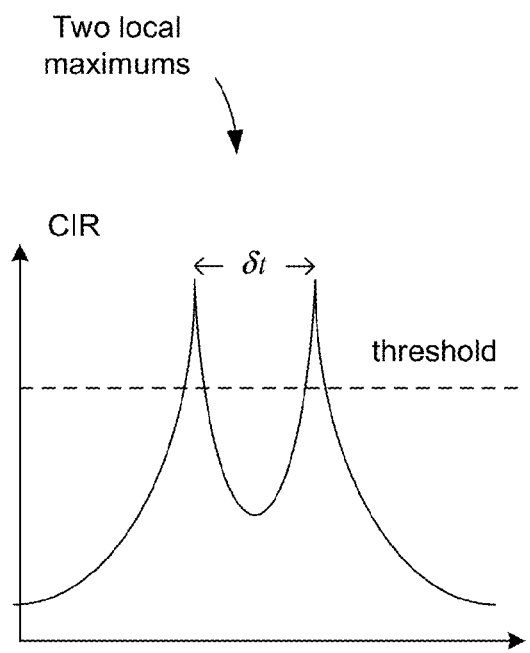
FIGS. 55 to 60 illustrate another method to determine a CSD mode by using a channel impulse response calculation, in accordance with some embodiments of the present invention.

FIG. 55 shows an example of a channel impulse response (CIR) of an OFDM signal from a two-transmitter system transmitting CSD signals with a cyclic shift of δt. A threshold value too high will miss peaks in actual (non-theoretical) channel impulse response data. A threshold value too low will count extra peaks in actual channel impulse response data. Channel impulse response of several symbols (K OFDM symbols) over time with a threshold value in between will result in a compromise where most of the time the correct number of peaks are found.

Figure 56:
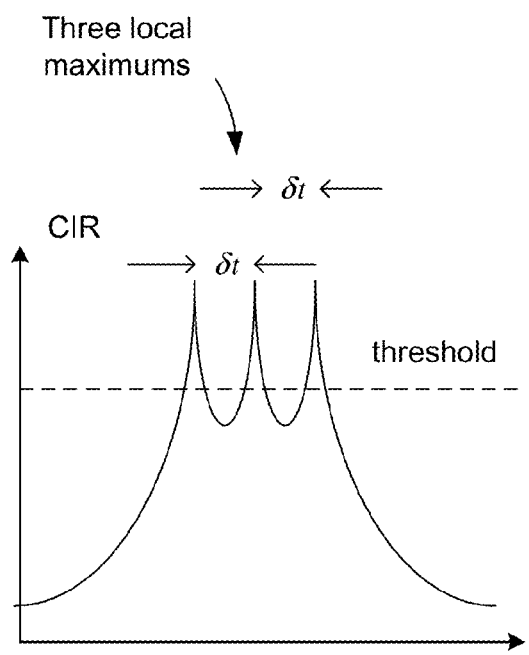
Figure 57:
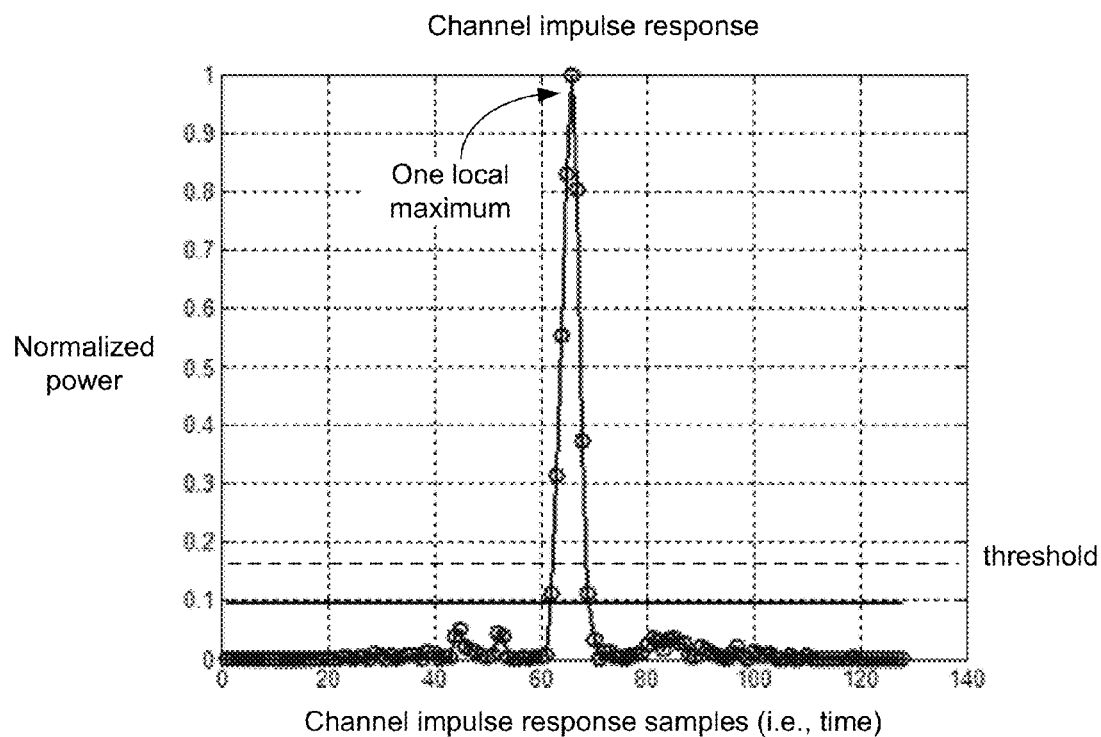
Figure 58:
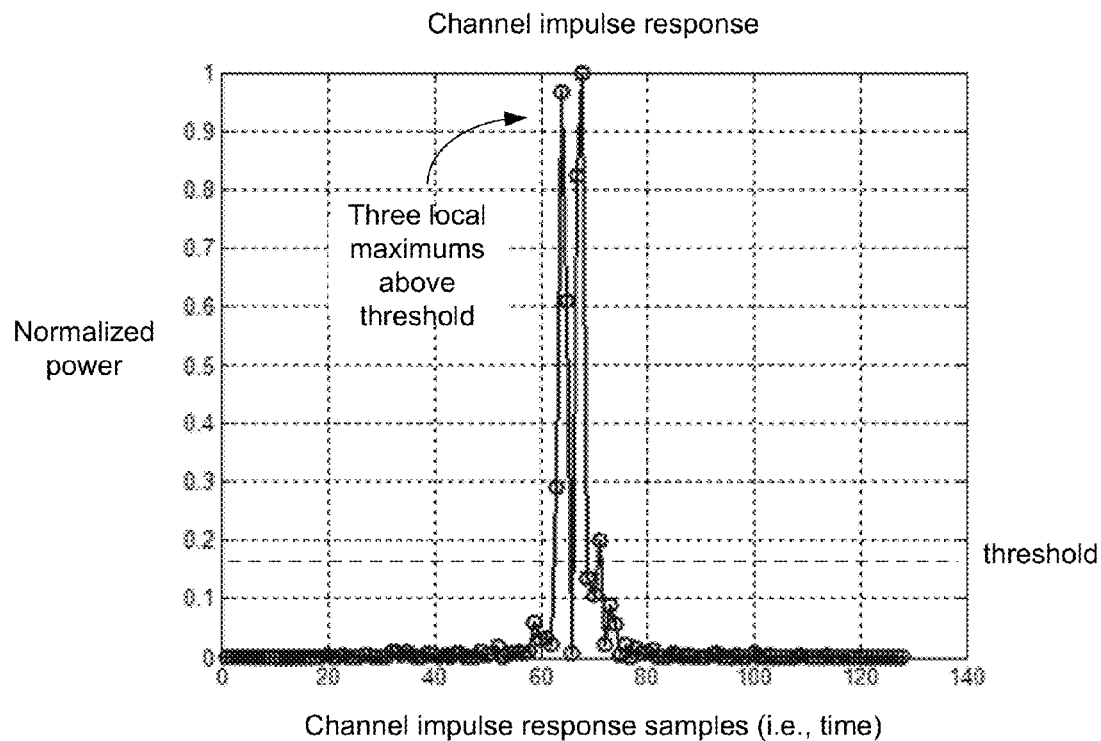

FIG. 56 shows an example of a channel impulse response of an OFDM signal from a three-transmitter system transmitting CSD signals with a cyclic shift of δt between successive pairs of peaks. FIG. 57 shows actual data of a channel impulse response when only a single transmitter is used. FIG. 58 shows actual data of a channel impulse response when only three transmitters are used. The plotted data shows two strong peaks and a weak peak in the measured OFDM signal. For a single window, one of the peaks might be missed for a single OFDM symbol time. Over several windows, however, the correct number of peaks will be found. In a typical case, the correct number of peaks found will outnumbering the number of times a peak is missed.

Figure 59:
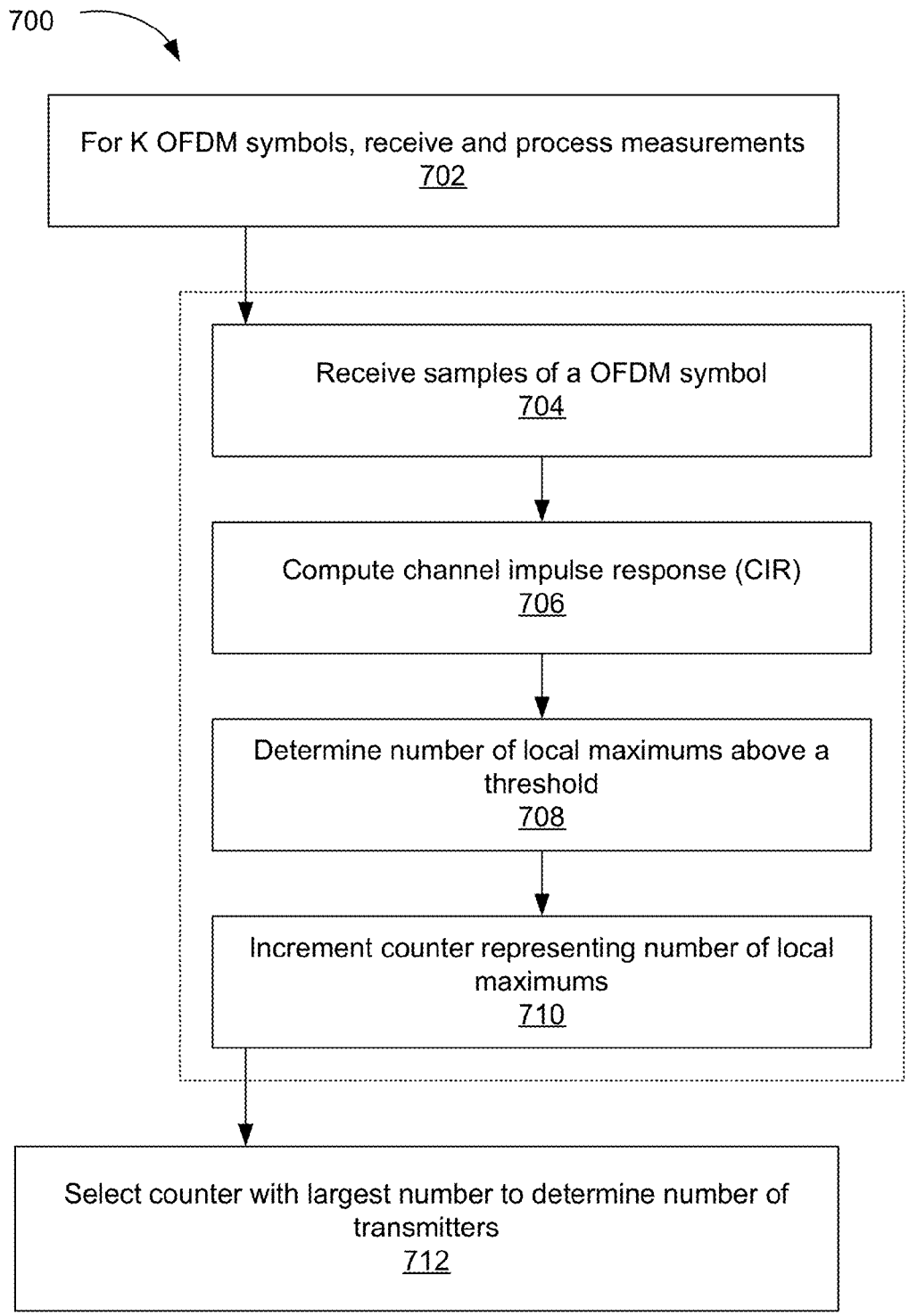

FIG. 59 shows a method 700 to determine, over the time of K OFDM symbols, a number of CSD transmitters. At 702, a loop beings for each K OFDM symbols to receive and process measurements. For each symbol, the loop is shown in more detail. At 704, a receiver receives measurements of the OFDM symbol. At 706, a processor computes a channel impulse response (CIR) based on the received samples. At 708, the processor determines a number of local maximums above a certain threshold. At 710, the processor increments a counter representing a number of local maximums found over time. The loop repeats with a new OFDM symbol. At 712, once the loop completes, the processor selects a counter with the largest number to determine a number of transmitters used.

Figure 60:
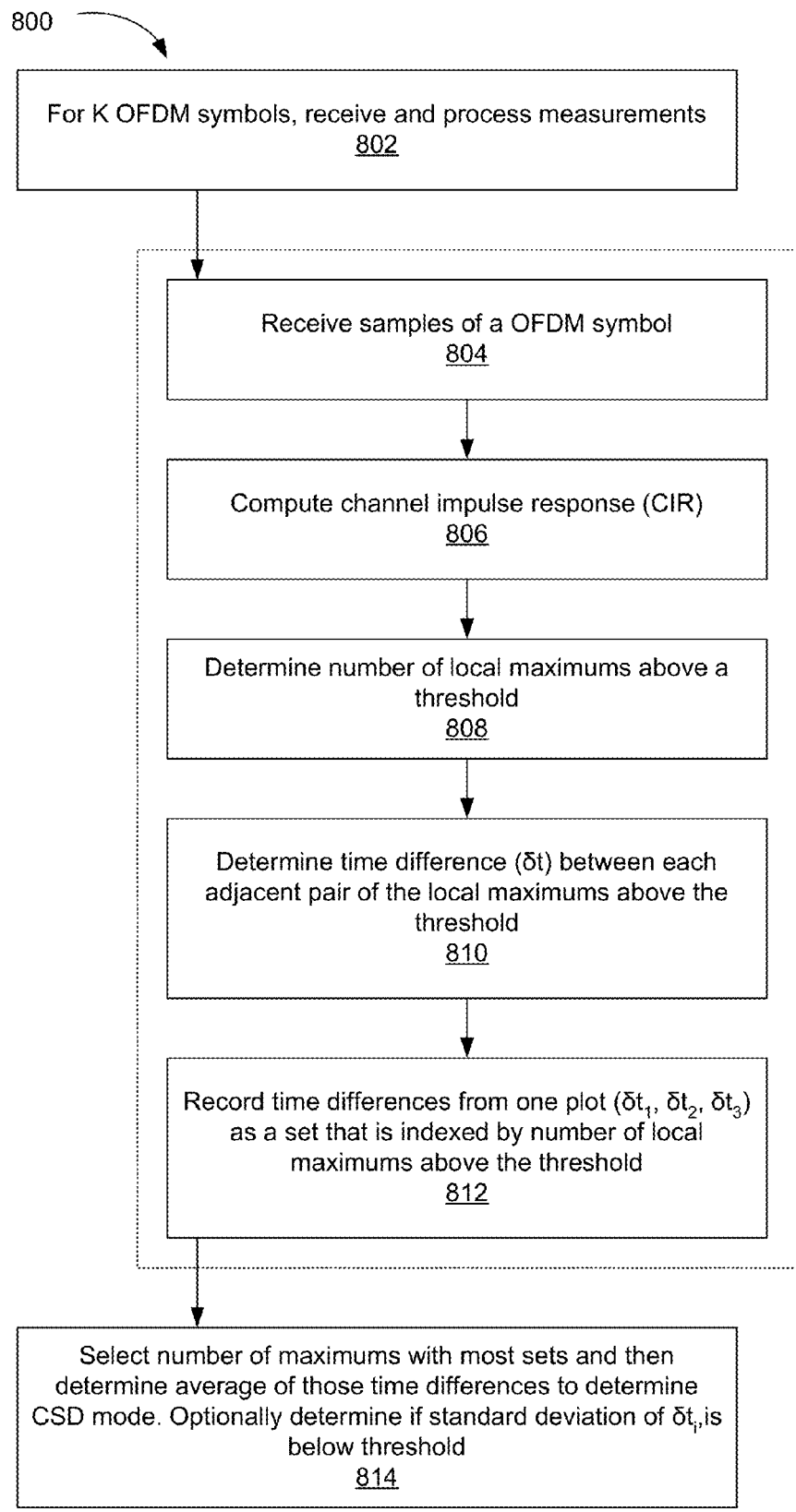

FIG. 60 shows a method 800 to determine, over the time of K OFDM symbols, a number of CSD transmitters and a temporal cyclic shift among those CSD transmitters. At 802, a loop beings for each K OFDM symbols to receive and process measurements. For each symbol, the loop is shown in more detail. At 804, a receiver receives measurements of the OFDM symbol. At 806, a processor computes a channel impulse response (CIR) based on the received samples. At 808, the processor determines a number of local maximums above a threshold. At 810, the processor determines a time difference (δt) between each adjacent pair of local maximums that are above a threshold. At 812, the processor records a time difference from one plot ($\delta t_1$, $\delta t_2$ or $\delta t_3$) as a set that is indexed by a number of local maximums above the threshold. The loop repeats with a new OFDM symbol. At 814, once the loop completes, the processor selects a number of maximums with the most sets and then determines an average of those time differences to determine a current CSD mode. Optionally, the processor also determines if a standard deviation of δt is below a threshold.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method for finding cyclic shift diversity (CSD), the method comprising:
   receiving, at a transceiver, an orthogonal frequency-division multiplexing (OFDM) symbol transmitted using a particular CSD mode;
   computing a channel impulse response (CIR) of the ODFM symbol to form CIR samples;
   determining local maxima in the CIR samples; and
   selecting a CSD mode being used based on the local maxima.

2. The method of claim 1, wherein computing the channel impulse response of the ODFM symbol to the form CIR samples comprises normalizing the CIR samples.

3. The method of claim 1, wherein determining the local maxima in the CIR samples comprises determining local maxima above a threshold.

4. The method of claim 1, wherein determining the local maxima in the CIR samples comprises counting the local maxima.

5. The method of claim 1, wherein determining the local maxima in the CIR samples comprises determining a time difference between adjacent ones of the local maxima.

6. The method of claim 1, wherein:
   receiving the orthogonal frequency-division multiplexing (OFDM) symbol comprises receiving k OFDM symbols;
   computing the channel impulse response of the ODFM symbol and determining the local maxima comprise, for each $j^{th}$ symbol of the k OFDM symbols:
      computing a channel impulse response of the $j^{th}$ ODFM symbol to form a $j^{th}$ set of CIR samples;
      determining local maxima in the $j^{th}$ set of CIR samples; and
      incrementing one of a set of counters each representing a number of local maxima; and
   selecting the CSD mode based on the local maxima comprises selecting the CSD mode based on the set of counters.

7. The method of claim 1, wherein:
   receiving the orthogonal frequency-division multiplexing (OFDM) symbol comprises receiving k OFDM symbols;
   computing the channel impulse response of the ODFM symbol and determining the local maxima comprise, for each $j^{th}$ symbol of the k OFDM symbols:
      computing a channel impulse response of the $j^{th}$ ODFM symbol to form a $j^{th}$ set of CIR samples;
      determining local maxima in the $j^{th}$ set of CIR samples; and
      determining time differences between adjacent ones of the local maxima; and
      saving the time differences to one of a set of records each representing a number of local maxima; and
   selecting the CSD mode based on the local maxima comprises selecting the CSD mode based on a set of counters.

8. A mobile device for finding cyclic shift diversity (CSD), the mobile device comprising:
   a transceiver, the transceiver for receiving an orthogonal frequency-division multiplexing (OFDM) symbol transmitted using a particular CSD mode; and
   a processor coupled to the transceiver, the processor for:
      computing a channel impulse response (CIR) of the ODFM symbol to form CIR samples;
      determining local maxima in the CIR samples; and
      selecting a CSD mode being used based on the local maxima.

9. The mobile device of claim 8, wherein computing the channel impulse response of the ODFM symbol to the form CIR samples comprises normalizing the CIR samples.

10. The mobile device of claim 8, wherein determining the local maxima in the CIR samples comprises determining local maxima above a threshold.

11. The mobile device of claim 8, wherein determining the local maxima in the CIR samples comprises counting the local maxima.

12. The mobile device of claim 8, wherein determining the local maxima in the CIR samples comprise determining a time difference between adjacent ones of the local maxima.

13. The mobile device of claim 8, wherein:
receiving the orthogonal frequency-division multiplexing (OFDM) symbol comprises receiving k OFDM symbols;
computing the channel impulse response of the ODFM symbol and determining the local maxima comprise, for each $j^{th}$ symbol of the k OFDM symbols:
  computing a channel impulse response of the $j^{th}$ ODFM symbol to form a $j^{th}$ set of CIR samples;
  determining local maxima in the $j^{th}$ set of CIR samples; and
  incrementing one of a set of counters each representing a number of local maxima; and
selecting the CSD mode based on the local maxima comprises selecting the CSD mode based on the set of counters.

14. The mobile device of claim 8, wherein:
receiving the orthogonal frequency-division multiplexing (OFDM) symbol comprises receiving k OFDM symbols;
computing the channel impulse response of the ODFM symbol and determining the local maxima comprise, for each $j^{th}$ symbol of the k OFDM symbols:
  computing a channel impulse response of the $j^{th}$ ODFM symbol to form a $j^{th}$ set of CIR samples;
  determining local maxima in the $j^{th}$ set of CIR samples; and
  determining time differences between adjacent ones of the local maxima; and
  saving the time differences to one of a set of records each representing a number of local maxima; and
selecting the CSD mode based on the local maxima comprises selecting the CSD mode based on a set of counters.

15. A mobile device for finding cyclic shift diversity (CSD), the mobile device comprising:
means for receiving an orthogonal frequency-division multiplexing (OFDM) symbol transmitted using a particular CSD mode;
means for computing a channel impulse response (CIR) of the ODFM symbol to form CIR samples;
means for determining local maxima in the CIR samples; and
means for selecting a CSD mode being used based on the local maxima.

16. The mobile device of claim 15, wherein means for computing the channel impulse response of the ODFM symbol to the form CIR samples comprises means for normalizing the CIR samples.

17. The mobile device of claim 15, wherein the means for determining the local maxima in the CIR samples comprises means for determining local maxima above a threshold.

18. The mobile device of claim 15, wherein the means for determining the local maxima in the CIR samples comprise means for counting the local maxima.

19. The mobile device of claim 15, wherein means for determining the local maxima in the CIR samples comprises means for determining a time difference between adjacent ones of the local maxima.

20. A non-transitory computer-readable storage medium including program code stored thereon, comprising program code for:
receiving an orthogonal frequency-division multiplexing (OFDM) symbol transmitted using a particular CSD mode;
computing a channel impulse response (CIR) of the ODFM symbol to form CIR samples;
determining local maxima in the CIR samples; and
selecting a CSD mode being used based on the local maxima.

\* \* \* \* \*